United States Patent
Levendel et al.

(10) Patent No.: US 7,668,146 B2
(45) Date of Patent: Feb. 23, 2010

(54) INTERNET-ORIENTED AD-HOC NETWORK

(75) Inventors: Isaac Levendel, Chicago, IL (US);
Reinhard Metz, Wheaton, IL (US);
Jacques Hara, Barrington, IL (US)

(73) Assignee: Connectivities LLC, Birmingham, MI (US)

( * ) Notice: Subject to any disclaimer, the term of this patent is extended or adjusted under 35 U.S.C. 154(b) by 210 days.

(21) Appl. No.: 11/014,700

(22) Filed: Dec. 20, 2004

(65) Prior Publication Data

US 2006/0133328 A1    Jun. 22, 2006

(51) Int. Cl.
*H04W 4/00*     (2009.01)
*H04L 12/28*    (2006.01)
*H04B 7/15*     (2006.01)

(52) U.S. Cl. ................. 370/338; 370/405; 455/11.1
(58) Field of Classification Search ............ None
See application file for complete search history.

(56) References Cited

U.S. PATENT DOCUMENTS

| | | | |
|---|---|---|---|
| 5,602,839 A * | 2/1997 | Annapareddy et al. | 370/405 |
| 5,654,959 A | 8/1997 | Baker et al. | |
| 5,987,011 A | 11/1999 | Toh | |
| 6,026,303 A | 2/2000 | Minamisawa | |
| 6,046,978 A * | 4/2000 | Melnik | 370/221 |
| 6,304,556 B1 | 10/2001 | Haas | |
| 6,307,843 B1 | 10/2001 | Okanoue | |
| 6,456,599 B1 | 9/2002 | Elliott | |
| 6,535,498 B1 | 3/2003 | Larsson et al. | |
| 6,580,981 B1 | 6/2003 | Masood et al. | |
| 6,628,620 B1 | 9/2003 | Cain | |
| 6,678,252 B1 | 1/2004 | Cansever | |
| 6,687,259 B2 | 2/2004 | Alapuranen | |
| 6,704,293 B1 | 3/2004 | Larsson et al. | |

(Continued)

FOREIGN PATENT DOCUMENTS

EP    1480387 A    11/2004

OTHER PUBLICATIONS

Perkins et al., Highly Dynamic Destination-Sequenced Distance-Vector Routing (DSDV) for Mobile Computers, Computer Communication Rev., ACM, NY, vol. 24, No. 4 (Oct. 1, 1994).

(Continued)

*Primary Examiner*—Nick Corsaro
*Assistant Examiner*—Joel Ajayi
(74) *Attorney, Agent, or Firm*—Michael K. Dixon; Akerman Senterfitt

(57) ABSTRACT

A hierarchical directional internet-oriented ad-hoc network, defined by a software infrastructure, is composed of fixed gateway nodes and a plurality of wireless nodes, which may be fixed or mobile, and which may act as subscribers, routers, or both. The infrastructure hierarchy is defined by the hop count of each node (distance of that node to a fixed gateway node). The software infrastructure includes two tables associated with each node in the network: the upstream routing table which provides shortest routes to fixed gateway nodes through upstream neighbors, and the downstream routing table which provides shortest routes to subscribers through downstream neighbors. These two tables are used by routing algorithms. A peer table can also be used for alternate routes. The maintenance of the aforementioned tables is performed by autonomous algorithms operating locally on each node by receiving and processing signals from their neighbors.

20 Claims, 17 Drawing Sheets

U.S. PATENT DOCUMENTS

| | | |
|---|---|---|
| 6,711,409 B1 | 3/2004 | Zavgren, Jr. et al. |
| 6,754,188 B1 | 6/2004 | Garahi et al. |
| 6,763,013 B2 | 7/2004 | Kennedy |
| 2002/0012320 A1 | 1/2002 | Ogier et al. |
| 2002/0058502 A1 | 5/2002 | Stanforth |
| 2002/0090949 A1 | 7/2002 | Stanforth |
| 2002/0173321 A1 | 11/2002 | Marsden et al. |
| 2003/0007453 A1 | 1/2003 | Ogier et al. |
| 2003/0079003 A1 | 4/2003 | Burr |
| 2005/0089015 A1* | 4/2005 | Tsuge et al. ................ 370/351 |
| 2006/0098607 A1* | 5/2006 | Zeng et al. ................. 370/338 |

OTHER PUBLICATIONS

Unknown author, "An Internet-Oriented Software-Defined Dynamic Infrastructure (IOSDDI) . . .", Slides and Notes from Oct. 15, 2004.
Schollmeier, et al., "Routing in Mobile Ad Hoc and Peer-to-Peer Networks", Lehrstuhl für Kommunikationsnetze, Technische Universität München, Arcisstr. 21, 80333 München, Germany.

\* cited by examiner

INTERNET-ORIENTED AD-HOC NETWORK

BACKGROUND

Ad-hoc networks are becoming more widely used, especially for mobile wireless devices. An attractive feature of ad-hoc networks is that they do not require a network infrastructure of base stations/fixed gateway nodes to enable communications between wireless nodes. Instead, the wireless nodes are capable of acting as base stations/access points that relay communications for other wireless nodes in the network. Thus, each node can, at various times, act as a source of information, a drain for information, and a router for information.

Traditionally, the focus of ad-hoc networks has been communications between wireless nodes on the network. More sophisticated ad-hoc networks that provide for access to fixed, wired networks have also been proposed. This allows wireless devices to communicate with other types of wired networks, such as the PSTN and the Internet.

One shortcoming associated with known ad-hoc networks, including the more sophisticated ad-hoc networks discussed above, is that they are typically oriented toward enabling communication between nodes, with the direction of such communication being somewhat random. These networks are not as efficient as possible for other types of communication, such as Internet-oriented communication, in which the flow of data is strongly directional (i.e., from fixed gateway nodes downward to wireless nodes and vice versa).

What is needed is a network that can efficiently handle communications such as the Internet that are directionally oriented.

SUMMARY

The aforementioned issues are addressed to a great extent by an ad-hoc network with an internet-oriented, software-defined dynamic infrastructure. The ad-hoc network includes at least one fixed gateway node and a plurality of wireless nodes. As used herein, a fixed gateway node means a node that is in a fixed location and that acts as a gateway, or access point, between the ad-hoc network and another network such as the Internet. In some embodiments, all of the wireless nodes are mobile. In other embodiments, some of the wireless nodes are mobile and some are at fixed locations, which shall be referred to herein as "home nodes." (As used herein, the term "home node" should be understood to refer to a wireless node that is in a fixed location and should not be understood to be limited to a fixed wireless node installed in a residence). At least some of the wireless nodes, and, in some embodiments, all of the wireless nodes, may perform a routing function for other wireless nodes. In embodiments with multiple fixed gateway nodes, the fixed gateway nodes may be connected to the other network via a central node or may be connected directly to the other network. In the latter case, the fixed gateway node serves as a central node.

This ad-hoc network is hierarchical based on distances, measured in hop counts, to fixed gateway nodes. Each of the wireless nodes in the network (which may be fixed wireless nodes or mobile wireless nodes) in the ad-hoc network has a hop count with respect to each fixed gateway node. Any given wireless node may have one or more neighborhood nodes with which the wireless node can communicate directly. The neighborhood nodes will be either upstream (i.e., closer, as measured by hop count, to the fixed gateway node), downstream (further away, as measured by hop count, from the gateway node), or at the same distance (referred to herein as a peer node).

Each wireless node in the network also has at least one of each of four tables that describe the node's neighborhood and that are used for routing and other functions: 1) a downstream neighbor table, 2) a downstream routing table, 3) an upstream routing table, and 4) a peer table. The upstream routing table lists each upstream node in the wireless node's neighborhood together with a hop count to the fixed gateway node. In embodiments with multiple fixed gateway nodes, there is a plurality of upstream routing tables and each upstream routing table pertains to a different fixed gateway node. The peer routing table lists each peer node in the node's neighborhood along with an associated hop count to the fixed gateway node and, in embodiments with multiple fixed gateway nodes, each node has a separate peer table for each fixed gateway node. The downstream neighborhood table lists each downstream neighbor with respect to a particular fixed gateway node (again, there is a separate downstream neighborhood table for each fixed gateway node in embodiments with multiple fixed gateway nodes). The downstream routing table lists each downstream node (including downstream neighborhood nodes) reachable from the node together with an associated hop count, and in embodiments with multiple fixed gateway nodes, there is a multiplicity of downstream routing tables and each downstream routing table pertains to a different fixed gateway node. The aforementioned tables define the connectivity for the network. A number of triggers are generated during routing and at other times to cause the update of these tables. The tables are also audited periodically, either on an individual node basis or for the tables as a whole.

BRIEF DESCRIPTION OF THE DRAWINGS

The aforementioned advantages and features will be more readily understood with reference to the following detailed description and the accompanying drawings in which.

DETAILED DESCRIPTION

In the following detailed description, a plurality of specific details, such as numbers of nodes and hops, are set forth in order to provide a thorough understanding of the embodiments described herein. The details discussed in connection with the preferred embodiments should not be understood to limit the present invention. Furthermore, for ease of understanding, certain method steps are delineated as separate steps; however, these steps should not be construed as necessarily distinct nor order dependent in their performance.

Figure 1:
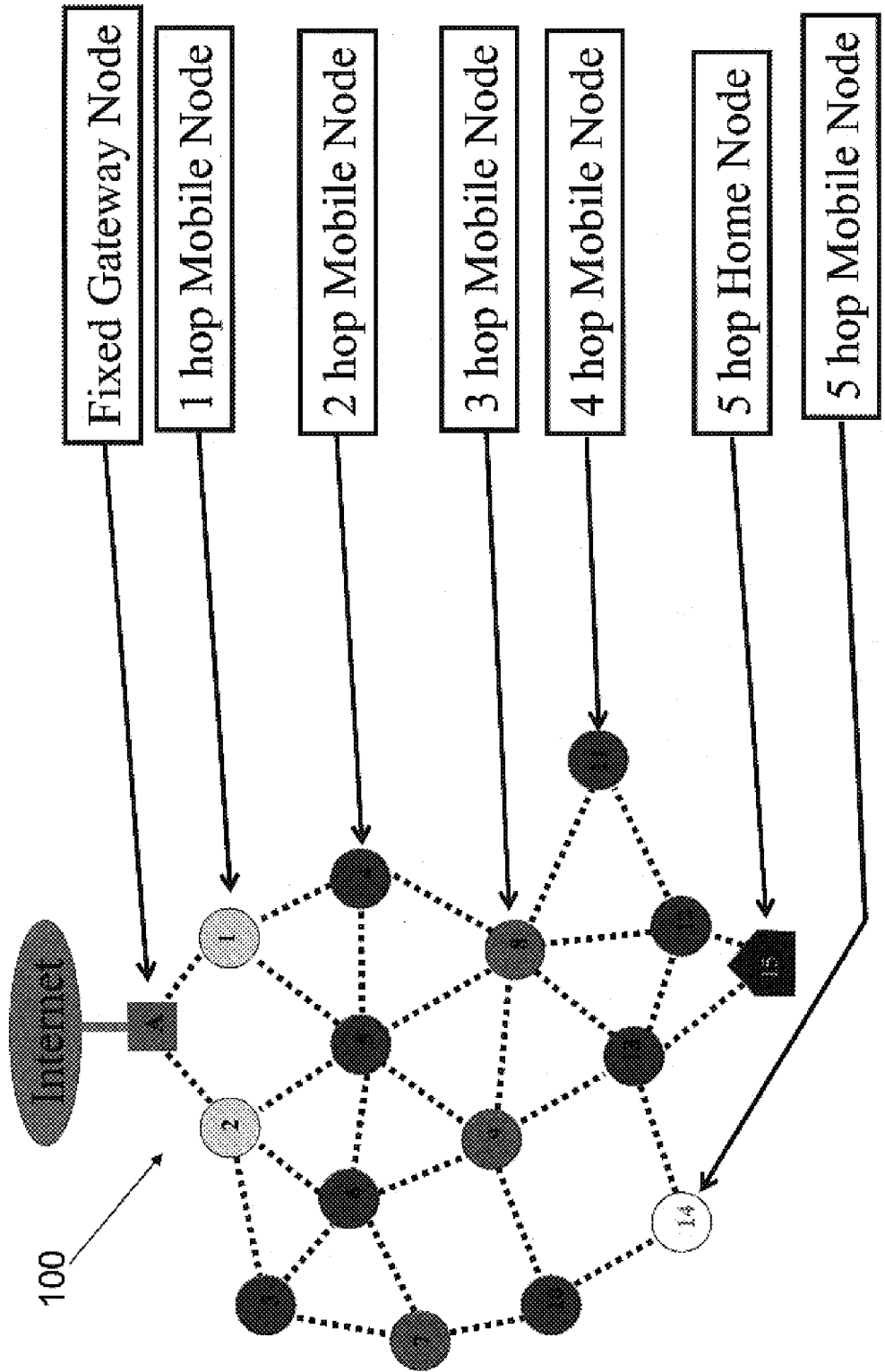
FIG. 1 is a schematic diagram of a network with one fixed gateway node according to a first embodiment.

An exemplary network 100 is illustrated in FIG. 1. The network 100 includes a fixed gateway node A, a plurality of mobile wireless nodes 1-14, and a home wireless node 15. The fixed gateway node A is connected to an Internet backbone and has wireless transmission and reception capability that allows it to act as an access point for a plurality of wireless nodes. Mobile wireless nodes 1-14 and home wireless node 15 also have wireless transmission and reception capability that allow them to communicate with other wireless nodes in the network and with the fixed gateway node (provided that the fixed gateway node is within range of the wireless transmission and reception system). Each of the mobile nodes 1-14 have the ability to act as routers for other wireless nodes in the network. (In alternative embodiments, only a portion of the mobile nodes have this ability.) The home node 15 does not have the ability to act as a router for other subscriber nodes in the embodiment of FIG. 1. Although only one home node 15 is illustrated in FIG. 1, it should be understood that there may be a plurality of such home nodes in other embodiments and that some or all of such home nodes may have the ability to act as routers. It should also be understood that, in various embodiments, a particular wireless node, whether it be mobile or fixed, may be configured such that it only acts as a router, only act as a subscriber (i.e., a source or drain of information) or acts as both a router and a subscriber.

As discussed above, the network 100 is an Internet-oriented network. Accordingly, each of the wireless nodes 1-15 can be classified based on the number of hops, or hop count, measured with respect to the fixed gateway node A. Nodes 1 and 2 have a hop count of 1, nodes 3-6 have a hop count of 2, nodes 7-9 have a hop count of 3, nodes 10-13 have a hop count of 4, and nodes 14 and 15 have a hop count of 5.

Each wireless node may have one or more other wireless nodes with which it is directly connected. As used herein, a second node is "directly connected" to a first node when the first node can communicate with the second node using its wireless communication system without requiring any other node to relay messages between the first and second nodes. The set of nodes that are directly connected to a node form the neighborhood for that node. The neighborhood for any wireless node can include nodes with lower hop counts (upstream nodes), nodes with the same hop count (peer nodes), and nodes with lower hop counts (downstream nodes).

Each of the nodes of the network 100 have at least one neighborhood node.

For example, the neighborhood for node 5 includes upstream nodes 1 and 2, peer nodes 4 and 6, and downstream nodes 8 and 9. Every node in the network 100 has at least one upstream node (which may be the fixed gateway node A or another wireless node), and some have a plurality of upstream nodes. At any given time in any particular network, a wireless node may have zero (in which case it is isolated), one or many upstream nodes and may have zero, one or many peer nodes and zero, one or many downstream nodes. Each node will have downstream neighborhood tables (DNTs) and peer tables (PTs) that list each downstream and peer neighbor, respectively, along with the corresponding hop count relative to the fixed gateway node.

Each wireless node will also have an upstream routing table (URT) which will include the fixed gateway node with which the URT is associated and all upstream nodes (nodes with lower hop counts) in that node's neighborhood. The URT will also include a hop count for each of the neighboring nodes listed in the URT. Exemplary URTs for nodes 1, 5, and 8 are provided in Tables 1, 2 and 3 below.

TABLE 1

URT for Node 1

| Node | Hop Count |
|------|-----------|
| A    | 1         |

TABLE 2

URT for Node 5

| Node | Hop Count |
|------|-----------|
| 1    | 1         |
| 2    | 1         |

TABLE 3

URT for Node 8

| Node | Hop Count |
|------|-----------|
| 4    | 2         |
| 5    | 2         |

The PT for a node will have a format similar to that of the URT, but will list peer neighbors rather than upstream neighbors. A detailed discussion of how the URTs and PTs are utilized for routing packets is set forth below.

Each node also has a downstream routing table, or DRT, which the node will utilize in order to determine how to rout packets downstream. The DRT for a node includes each node that is reachable from a node by traveling in a purely downstream direction regardless of the number of hops. In other words, an other node is included in the DRT for a particular node if and only if a path exists from the particular node to the other node, and that path is purely downstream (i.e., each successive node on the path has a higher hop count than the previous node). One result of the foregoing is that routing will always be done through the shortest path as measured by hop count. Another consequence is that the DRT of a node with only upstream and/or peer neighbors will be empty.

Three different types of downstream routing tables may be utilized: DRTs indexed by destination node, DRTs indexed by downstream neighbors, and DRTs double-indexed by both destination node and by downstream neighbors. Examples of the first type of DRT for nodes 1, 2 and 5 and fixed gateway node A are presented below in tables 4-7:

TABLE 4

DRT Indexed by Destination Node for Node 1

| Node | Hop Count | Through Downstream Neighbors |
|---|---|---|
| 4 | 1 | — |
| 5 | 1 | — |
| 8 | 2 | 4, 5 |
| 9 | 2 | 5 |
| 10 | 3 | 5 |
| 11 | 3 | 4, 5 |
| 12 | 3 | 4, 5 |
| 13 | 3 | 4, 5 |
| 14 | 4 | 4, 5 |

TABLE 5

DRT Indexed by Destination Node for Node 2

| Node | Hop Count | Through Downstream Neighbors |
|---|---|---|
| 3 | 1 | — |
| 5 | 1 | — |
| 6 | 1 | — |
| 7 | 2 | 3, 6 |
| 8 | 2 | 5 |
| 9 | 2 | 5, 6 |
| 10 | 3 | 3, 5, 6 |
| 11 | 3 | 5 |
| 12 | 3 | 5 |
| 13 | 3 | 5, 6 |
| 14 | 4 | 3, 5, 6 |

TABLE 6

DRT Indexed by Destination Node for Node 5

| Node | Hop Count | Through Downstream Neighbors |
|---|---|---|
| 8 | 1 | — |
| 9 | 1 | — |
| 10 | 2 | 9 |
| 11 | 2 | 8 |
| 12 | 2 | 8 |
| 13 | 2 | 8, 9 |
| 14 | 3 | 8, 9 |

TABLE 7

DRT Indexed by Destination Node for Fixed Gateway Node A

| Node | Hop Count | Through Downstream Neighbors |
|---|---|---|
| 1 | 1 | — |
| 2 | 1 | — |
| 3 | 2 | 2 |
| 4 | 2 | 1 |
| 5 | 2 | 1, 2 |
| 6 | 2 | 2 |
| 7 | 3 | 2 |
| 8 | 3 | 1, 2 |
| 9 | 3 | 1, 2 |
| 10 | 3 | 1, 2 |
| 11 | 4 | 1, 2 |
| 12 | 4 | 1, 2 |

TABLE 7-continued

DRT Indexed by Destination Node for Fixed Gateway Node A

| Node | Hop Count | Through Downstream Neighbors |
|---|---|---|
| 13 | 4 | 1, 2 |
| 14 | 5 | 1, 2 |
| 15 | 5 | 1, 2 |

Certain aspects of the DRTs listed above are worth noting. First, for all nodes in the DRT that are not directly accessible, the third column of the DRT indicates the directly accessible neighboring nodes through which such non-directly accessible nodes can be reached.

A second aspect of the DRT tables is that not all nodes with higher hop counts that could possibly be reached from a given node are included in the DRT. For example, the DRT for node 2 does not include an entry for node 4 even though node 4 has a higher hop count (2, as compared to a hop count of 1 for note 2) and even though there is a path from node 2 to node 4 through node 5 that does not require any upstream travel. The reason why node 4 is not included in the DRT for node 2 is that the portion of the aforementioned path from node 5 to node 4 is not purely downstream because both node 4 and node 5 have a hop count of 2 (i.e., nodes 4 and 5 are peers). Similarly, node 8 is listed in the DRT for node 2, but no path through node 6 is shown. Again, this ensures that packets will be routed upstream toward the fixed gateway node through the shortest path as measured by hop counts.

A third aspect of the DRT tables is that multiple paths are shown in some instances. For example, the DRT for node 1 shows that node 11 is reachable in three hops via either node 4 or node 5. The choice between possible paths can be made by the node based on a random selection, relative loading of the multiple nodes, or any other technique.

A second type of DRT is indexed by downstream neighbors rather than by destination node. For each downstream neighboring node, the DRT includes a list of all nodes reachable through purely downstream paths along with an associated hop count. This type of DRT is advantageous because its construction is simple—the DRTs of downstream neighboring nodes are simply concatenated. However, this type of DRT requires a search of the DRT table in order to select a shortest path for a particular destination. Examples of this second type of DRT for nodes 2, 3 and fixed gateway node A are set forth below in Tables 8-10 below:

TABLE 8

DRT Indexed By Downstream Neighbor for Node 2

| Nodes Reachable Through Node 3/HC | Nodes Reachable Through Node 5/HC | Nodes Reachable Through Node 6/HC |
|---|---|---|
| 3/1 | 5/1 | 6/1 |
| 7/2 | 8/2 | 7/2 |
| 10/3 | 9/2 | 9/2 |
| 14/4 | 10/3 | 10/3 |
|  | 11/3 | 13/3 |
|  | 12/3 | 14/4 |
|  | 13/3 | 15/5 |
|  | 14/4 |  |
|  | 15/5 |  |

TABLE 9

DRT Indexed By Downstream Neighbor for Node 3

Nodes Reachable Through Node 7/HC

7/1
10/2
14/3

TABLE 10

DRT Indexed By Downstream Neighbor
for Fixed Gateway node A

| Nodes Reachable Through Node 1/HC | Nodes Reachable Through Node 2/HC |
|---|---|
| 1/1 | 2/1 |
| 4/2 | 3/2 |
| 5/2 | 5/2 |
| 8/3 | 6/2 |
| 9/3 | 7/3 |
| 10/4 | 8/3 |
| 11/4 | 9/3 |
| 12/4 | 10/4 |
| 13/4 | 11/4 |
| 14/5 | 12/4 |
| 15/5 | 13/4 |
|  | 14/5 |
|  | 15/5 |

As alluded to above, an advantage of using DRTs indexed by downstream neighboring nodes is that they are easily constructed and updated using information from downstream nodes. Each column of the DRTs above represents the downstream cluster of the corresponding downstream neighbor. The downstream cluster for any particular node can be formed by simply forming the union of each of the columns of the DRT for that node, adding 1 to each of the hop counts in the union, and then adding the particular node along with a hop count of 0. Thus, for example, downstream cluster for node 2 ($DC_2$) is shown below in table 11:

TABLE 11

$DC_i$ for Node 2

| | |
|---|---|
| 2/0 | Node 2 itself with HC = 0 |
| 3/1 | |
| 5/1 | |
| 6/1 | |
| 7/2 | |
| 8/2 | union of columns of |
| 9/2 | DRT of node 2 with |
| 10/3 | associated hop counts |
| 11/3 | |
| 12/3 | |
| 13/3 | |
| 14/4 | |
| 15/4 | |

As will be discussed in further detail below, the DC for a node is sent by that node to its upstream neighbors in a trigger message.

The third type of DRT is double indexed by both destination and downstream neighbor. An example of this type of double-indexed DRT for node 2 is provided in Table 12 below (where "x" signifies that a route exists between the given node and the destination node corresponding to a row through the downstream neighbor corresponding to a column):

TABLE 12

Double-Indexed DRT for Node 2

| Destination Node | Nodes Reachable Thru Node 3/HC | Nodes Reachable Thru Node 5/HC | Nodes Reachable Thru Node 6/HC |
|---|---|---|---|
| 3 | x/1 | | |
| 5 | | x/1 | |
| 6 | | | x/1 |
| 7 | x/2 | | x/2 |
| 8 | | x/2 | |
| 9 | | x/2 | x/2 |
| 10 | x/3 | x/3 | x/3 |
| 11 | | x/3 | |
| 12 | | x/3 | |
| 13 | | x/3 | x/3 |
| 14 | x/4 | x/4 | x/4 |
| 15 | | x/4 | x/4 |

Double-indexed DRT tables have the advantages of efficiency for both construction and routing. In preferred embodiments, the DRTs are represented as sparse matrices when used with large numbers of nodes.

Figure 2:
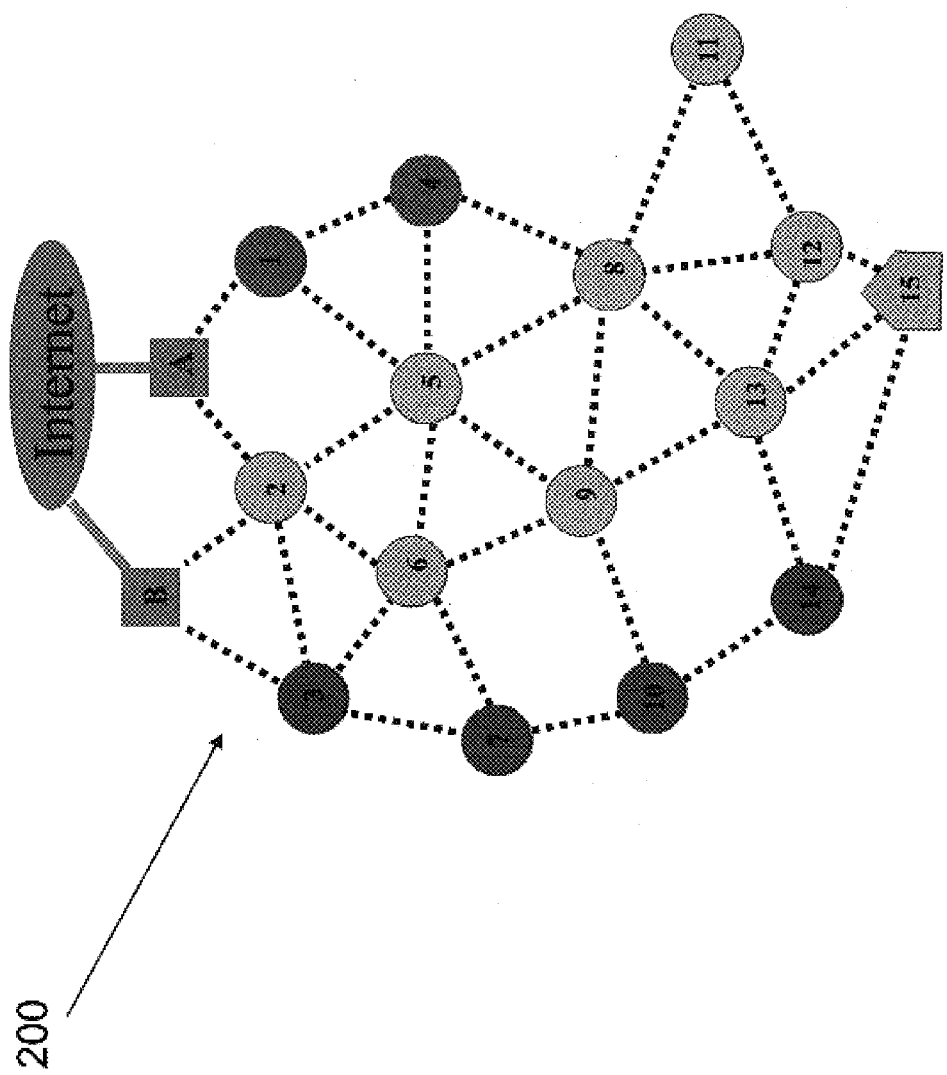
FIG. 2 is a schematic diagram of a network with two fixed gateway nodes according to a second embodiment.
Figure 3:
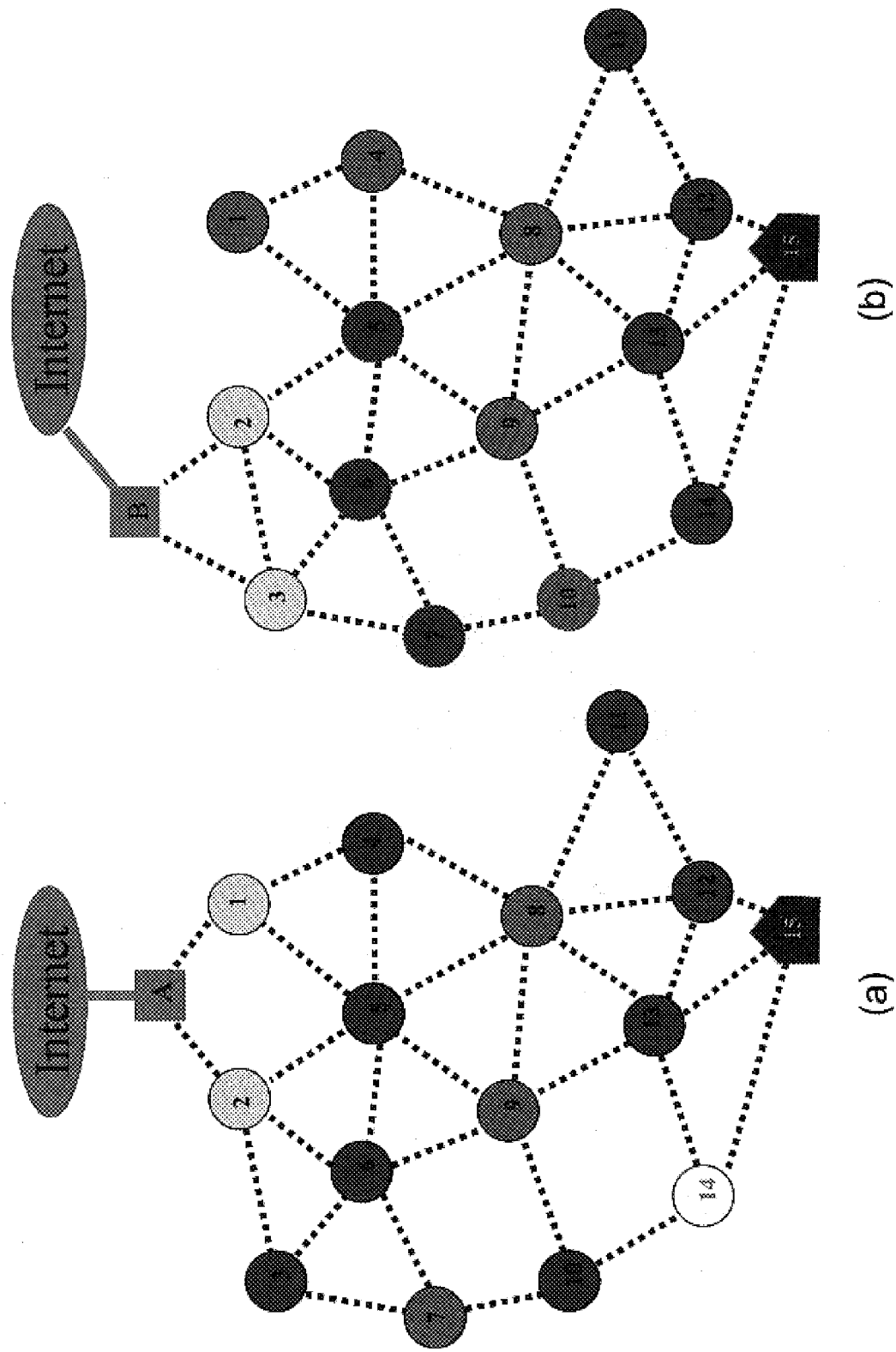
FIGS. 3a and 3b are conceptual schematic diagrams illustrating two superimposed networks that together comprise the network of FIG. 2.

In the network 100 of FIG. 1, there is only a single fixed gateway node A. However, it will be readily apparent that networks sometimes include multiple fixed gateway nodes. An example of a network 200 with the same wireless nodes 1-15 and two fixed gateway nodes A and B is illustrated in FIG. 2. As illustrated in FIGS. 3(*a*) and 3(*b*), the network 200 can be thought of as the superimposition of the two networks 300, 400, one with fixed gateway node A and one with fixed gateway node B. Thus, the methods set forth above with respect to the network 100 of FIG. 1 can be extended to the two fixed gateway node network 200 of FIG. 2 by creating URTs, PTs, and DRTs for each node for each of the individual networks illustrated in FIGS. 3(*a*) and 3(*b*).

Some nodes (e.g., node 1) will have only a single URT because only one fixed gateway node is upstream of that node. Other nodes (e.g., node 3) will have multiple URTs for multiple fixed gateway nodes, but one URT will have a shorter route than the other (node 3 is one hop from fixed gateway node B but is two hops from fixed gateway node A). In this case, the URT corresponding to the shortest distance (smallest number of hops) is designated as the primary URT and the other URT is designated as the secondary URT. The secondary URTs can be used in cases where the path to the primary fixed gateway node associated with the primary URT is blocked. Finally, still other nodes will have multiple URTs with the same minimum distance/hop count. In such cases, both URTs will be designated as primary and both will used for routing purposes. The choice of which of the multiple URTs to use can be based on load balancing, random selection, or some other process.

Maintaining multiple node associations (through primary and secondary URTs or multiple primary URTs as well as in a single URT) is useful and important for three reasons: 1) as a vehicle moves, it may drop its principal association with one fixed gateway node and move to a new one; 2) a failure in part of the network may be recovered by using alternate routing through alternate nodes; and 3) alternate paths may be used for load balancing purposes.

Figure 4:
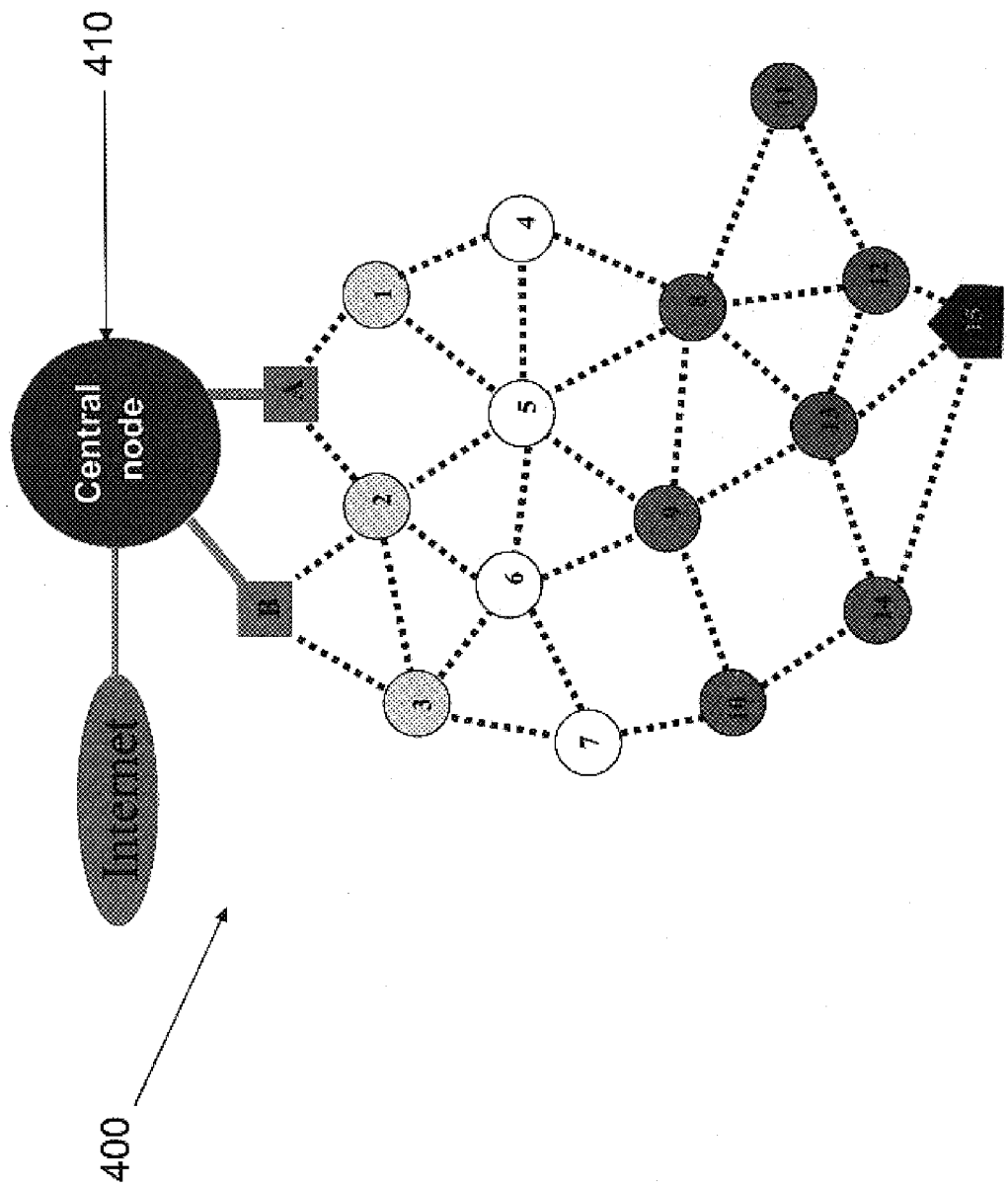
FIG. 4 is a schematic diagram of a network with fixed gateway nodes routed through a central node according to a third embodiment.

In the network 200 illustrated in FIG. 2, node 3 is only associated with fixed gateway node B and node 1 is only associated with fixed gateway node A. Also, node 3 is not in either the DRT or the URT for node 1, and vice-versa. One way in which to effect communications between these nodes is via the Internet. However, in other embodiments of the invention, the fixed gateway nodes are linked to a central node which is then connected to the Internet. An example of such a network 400 with fixed gateway nodes A and B linked to central node 410 is illustrated in FIG. 4. In such an embodiment, the central node 410 has a downstream routing table for each of the fixed gateway nodes and each of the wireless nodes in the network. Exemplary DRTs are set forth in Tables 13 and 14 below (although not shown below, double-indexed DRTs are also possible):

TABLE 13

Central Node DRT with Indexing by Downstream Neighbors

| Target Node | Hop Count | Through Downstream Neighbors |
|---|---|---|
| A | 1 | |
| B | 1 | |
| 1 | 2 | A |
| 2 | 2 | A, B |
| 3 | 2 | B |
| 4 | 3 | A |
| 5 | 3 | A, B |
| 6 | 3 | A, B |
| 7 | 3 | B |
| 8 | 4 | A, B |
| 9 | 4 | A, B |
| 10 | 4 | A, B |
| 11 | 5 | A, B |
| 12 | 5 | A, B |
| 13 | 5 | A, B |
| 14 | 5 | A |
| 15 | 6 | A, B |

TABLE 14

Central Node DRT with Indexing by Destination Nodes

| Nodes Reachable Through A/HC | Nodes Reachable Through B/HC |
|---|---|
| A/1 | B/1 |
| 1/2 | 2/2 |
| 2/2 | 3/2 |
| 4/3 | 5/3 |
| 5/3 | 6/3 |
| 6/3 | 7/3 |
| 8/4 | 8/4 |
| 9/4 | 9/4 |
| 11/5 | 10/4 |
| 12/5 | 11/5 |
| 13/5 | 12/5 |
| 15/6 | 13/5 |
| | 14/5 |
| | 15/6 |

A node associated with multiple fixed gateway nodes A, B, C, etc. will have one set of the URT, PT, DNT and DRT for each of the corresponding fixed gateway nodes A, B, C, etc., respectively.

The routing algorithm from the internet to a subscriber (downstream routing) uses the DRTs to select one of several possible shortest routes to the subscriber. The routing algorithm from a subscriber to the Internet uses the URTs to select one of several possible shortest routes to the Internet. Subscriber to subscriber routing will use both DRTs and URTs. Alternate routing through upstream and downstream neighbors may be chosen in the case of routing failure, for "handover" from one fixed gateway node to another, or for load balancing.

The creation of the routing tables, and hence the network, will now be discussed. The process begins by constructing upstream routing tables. Initially, all wireless nodes have an infinite hop count, no neighbors, and empty URTs, and fixed gateway nodes have a zero hop count, no downstream neighbors and empty DRTs. As wireless nodes detect other nodes (which may be accomplished through periodic broadcast polling messages), the other wireless nodes are registered into that node's PT with an equal infinite hop count. As the fixed gateway nodes detect directly connected wireless nodes, those wireless nodes are assigned a hop count of 1. The wireless nodes detected by the fixed gateway node then propagate the information concerning the fixed gateway node to other nodes they have previously detected as peers and to new wireless nodes detected thereafter (the techniques by which this information is propagated will be discussed in further detail below). In this manner, the upstream hierarchy is established.

The DRT construction process can be triggered in either of two ways: 1) when the process of URT construction reaches nodes without downstream neighbors; or 2) when a node modifies its URT. In addition, events encountered during packet routing operations will also trigger modifications to the routing tables as discussed in further detail below.

Use of the routing tables to perform routing operations will now be discussed with reference to the logic diagram 500 of FIG. 5. The process begins when the next packet arrives at step 510. If the packet is intended for the node at which it is received at step 520, the process is complete and step 510 is repeated. Otherwise, the direction of routing required—upstream, downstream, or subscriber-to-subscriber—is determined. There are several ways in which the routing direction of a packet can be determined. In some embodiments, each node can have separate buffers for upstream, downstream and subscriber-to-subscriber packets. In other embodiments, the routing process determines the direction based on the destination. In still other embodiments, the packets include a flag that indicates the direction. Other techniques will be readily apparent to those of skill in the art and are within the purview of the invention.

If downstream routing is required, subroutine 530 is performed. If upstream routing is required, subroutine 540 is performed. Finally, if subscriber-to-subscriber routing is required, subroutine 550 is performed.

Figure 5:
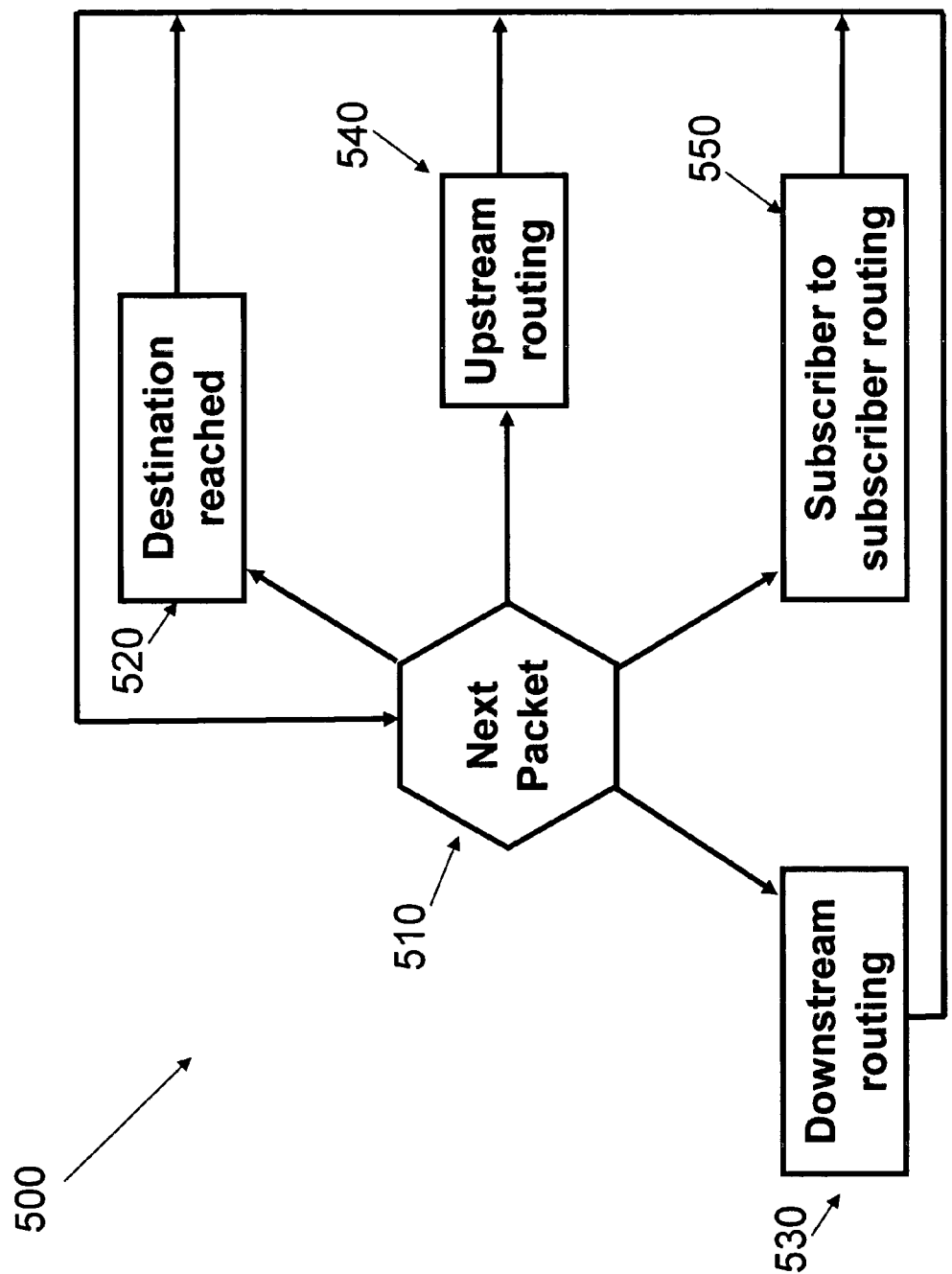
FIG. 5 is a logic diagram illustrating a packet routing process.
Figure 6:
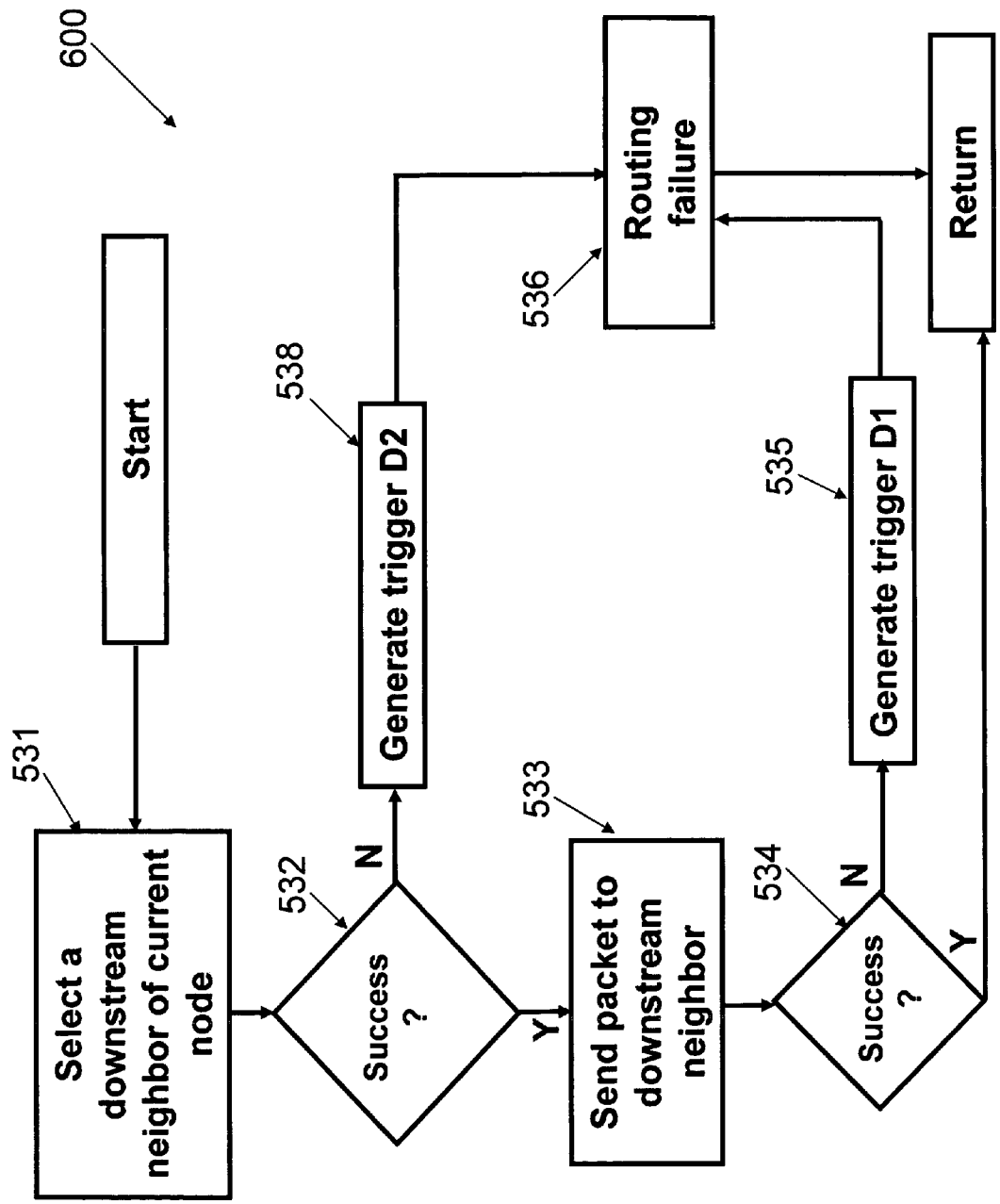
FIG. 6 is a flowchart illustrating in further detail the processing associated with one of the steps of FIG. 5.

The downstream routing subroutine 530 of FIG. 5 is illustrated in further detail in the flowchart 600 of FIG. 6. A downstream neighbor is selected from the DRT at step 531. If the destination node is a downstream neighbor, the packet is transmitted directly to that node. If a destination node is not a downstream neighbor (i.e., is not directly connected) but there is only a single path to that node available, the downstream neighbor node associated with that path is chosen. Otherwise, if multiple paths to the destination node are available, a choice between the available paths is made. The choice can be made any number of ways, including random selection from among the available paths, selection of the first available path found in the routing tables, selection of the least loaded downstream neighbor, etc. As will be discussed further below, peer routing is also possible.

If the selection of a downstream neighbor at step 531 was successful (i.e., a downstream neighbor was found in the routing tables) at step 532, an attempt to transmit the packet to the selected downstream neighbor is made at step 533. If the packet was successfully transmitted to the selected downstream neighbor at step 534, the downstream routing subroutine ends and control returns to step 510 of FIG. 5 for processing of the next packet.

If the attempt at step 533 to transmit the packet to the selected downstream neighbor was unsuccessful at step 534, then a trigger D1 is generated at step 536 and a routing failure procedure is initiated at step 537. Triggers, including the trigger D1, are messages that trigger a routing table update process upon the occurrence of some event. Triggers and the updating of routing tables will be discussed in further detail below. The routing failure procedure of step 637 may be handled in a number of ways. One possibility is that the packet is simply dropped, which will result in the sender failing to receive an acknowledgment from the destination node. Another possibility is to send a failure message to the sending node. This will allow the sending node to send another packet as soon as possible (i.e., without waiting for a timeout for an acknowledgment message). This may be desirable for time-sensitive applications, but there is a performance penalty associated with sending such failure messages. Other possibilities will be apparent to those of skill in the art.

In addition to the trigger D1 of step 536, a second trigger D2 will be generated at step 538 if no downstream neighbor could be located in the DRT at step 531. The D2 trigger occurs because the upstream neighbor's DRT indicated that a path to the destination node was available through a node but that node's DRT does not include the destination node. The processing of the D2 and other triggers will be discussed in further detail below.

Figure 7:
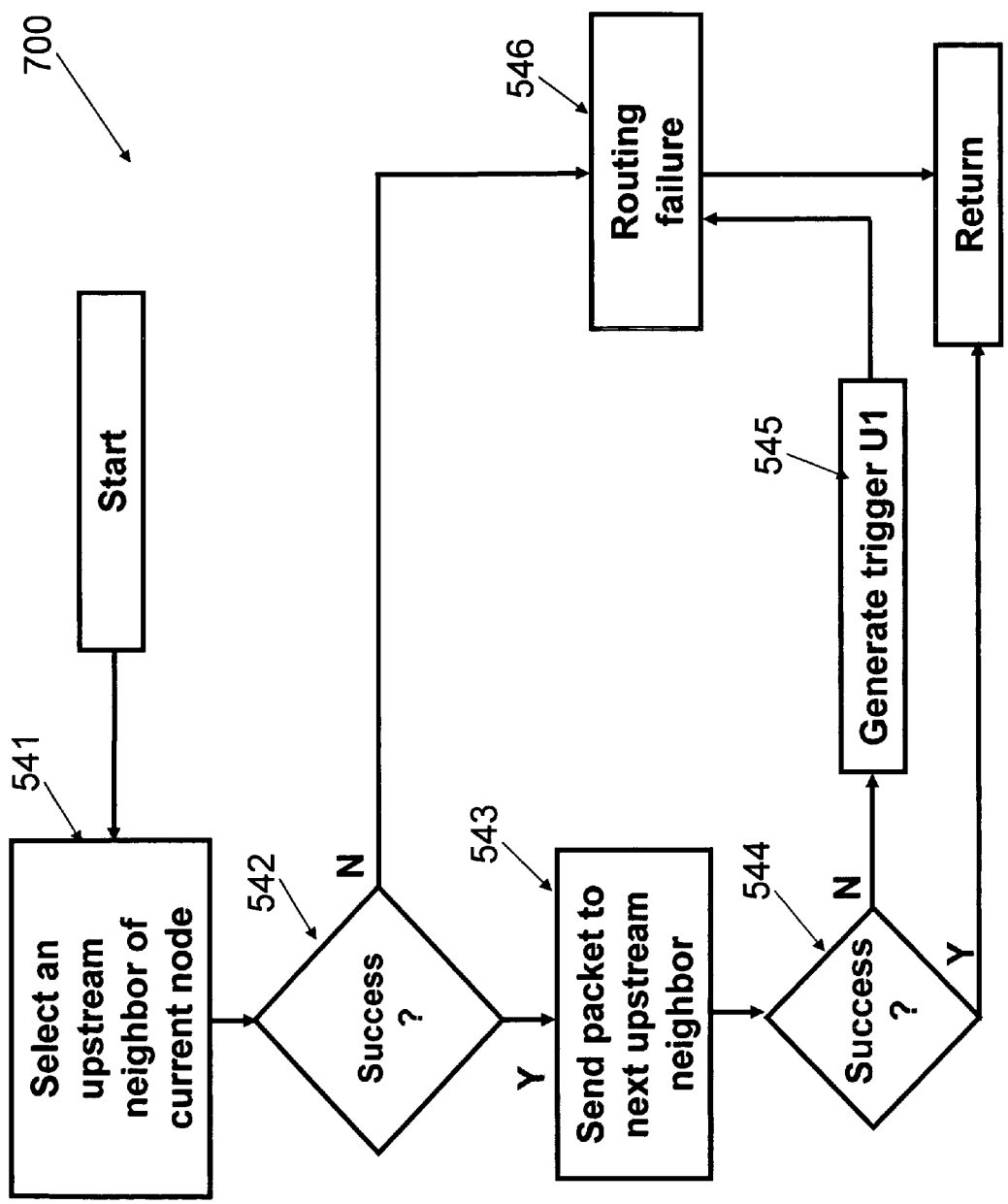
FIG. 7 is a flowchart illustrating in further detail the processing associated with another of the steps of FIG. 5.

The upstream routing subroutine 540 of FIG. 5 is illustrated in further detail in the flowchart 700 of FIG. 7. An upstream neighbor is selected from the URT at step 541. If the destination node is the upstream neighbor, the packet is transmitted directly to that node. If a destination node is not a an upstream neighbor (i.e., is not directly connected) but there is only a single path to that node available, the upstream neighbor node associated with that path is chosen. (Note that this will be the case where the hop count of the receiving node is 1, because the only upstream neighbor that will be fixed gateway node.) Otherwise, if multiple paths to the destination node are available, a choice between the nodes in the URT (excluding the fixed gateway node, which cannot be directly connected if multiple paths exist) is made. As discussed above in connection with the downstream routing process of FIG. 6, the choice can be made any number of ways, including random selection from among the available paths, selection of the first available path found in the routing tables, selection of the least loaded upstream neighbor, etc. Again, peer routing is also possible.

If the selection of an upstream neighbor at step 541 was successful (i.e., an upstream neighbor was found in the routing tables) at step 542, an attempt to transmit the packet to the selected upstream neighbor is made at step 543. If the packet was successfully transmitted to the selected upstream neighbor at step 544, the upstream routing subroutine ends and control returns to step 510 of FIG. 5 for processing of the next packet.

If the attempt at step 543 to transmit the packet to the selected downstream neighbor was unsuccessful at step 544, then a trigger U1 is generated at step 546. Again, the processing of triggers will be discussed in further detail below. After the U1 trigger is generated at step 546, or if an upstream neighbor could not be located at step 542, a routing failure procedure is initiated at step 546. Like the downstream routing failure procedure, the upstream routing failure procedure of step 546 may be handled in a number of ways. One possibility is that the packet is simply dropped, which will result in the sender failing to receive an acknowledgment from the destination node. A second possibility is to send a failure message to the sending node.

The subscriber-to-subscriber routing subroutine 550 of FIG. 5 functions by utilizing a combination of the upstream and downstream routing procedures. When a subscriber node wishes to send a packet to another subscriber node that is not in that node's DRT, the packet is sent using the upstream routing subroutine 540 described above in connection with the flowchart 700 of FIG. 7. When the packet reaches the central node, the central node will send the packet downstream using the downstream routing subroutine 530 described above in connection with the flowchart 600 of FIG. 6.

The routing algorithms discussed above do not use the nodes in the PTs to route packets to peers. Thus, the PTs are only used in the event of changes to the routing tables (e.g., through trigger messages as will be discussed in further detail below). However, as alluded to above, the routing algorithms may be modified to use the PTs. In some embodiments, the PTs are used as alternate upstream routes. In other embodiments, the PTs may be used for downstream routing. In such cases, because peer neighbors do not necessarily include the same subscribers in their DRTs, the construction of the DRTs is modified to include the DRTs of peers as well. This allows for the use of alternate downstream routes through peers whenever available and useful without modification of the downstream routing process.

Triggers will now be discussed in greater detail. As mentioned above, triggers are messages that are generated upon the occurrence of some event that trigger the updating of routing tables at the receiving node. The processing of triggers is handled locally by the node receiving the trigger, and the processing of a trigger may generate another trigger of the same type or of a different type. As discussed above, three triggers—D1, D2 and U1—are generated by the routing algorithms. The processing of these triggers will be discussed in detail.

Figure 8:
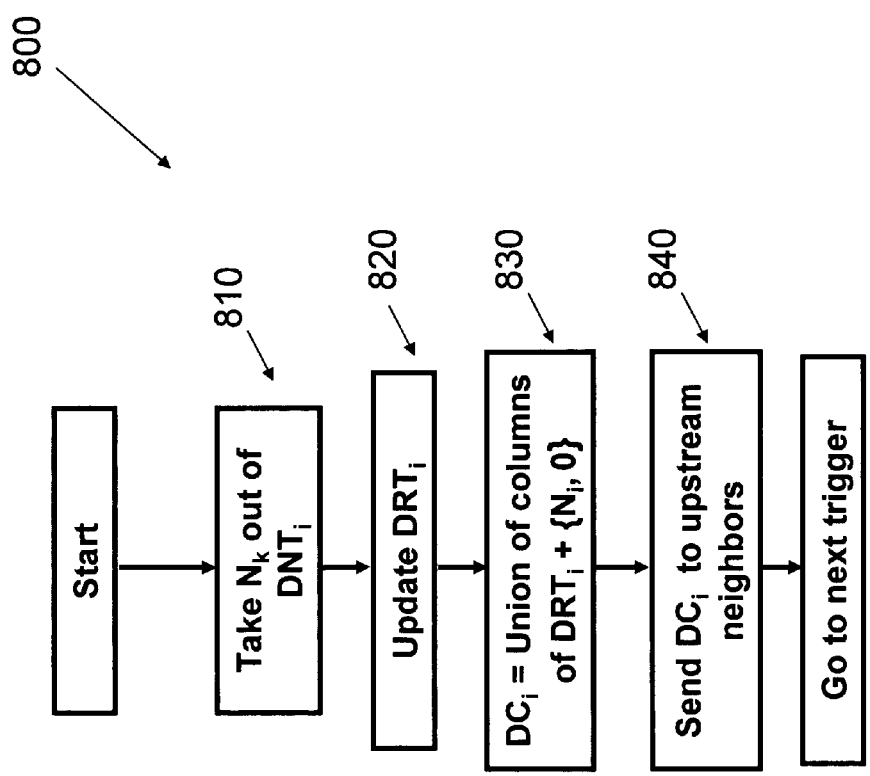
FIG. 8 is a flowchart illustrating the processing associated with a downstream trigger D1.

Trigger D1 occurs when a packet cannot be sent successfully to a downstream neighbor in a node's DRT. The processing of trigger D1 is shown in the flowchart 800 of FIG. 8. Upon receipt of a D1 trigger, the downstream neighbor $N_k$ to which the packet could not be sent is taken out of the downstream neighborhood table at step 810. If the DRT is of the type indexed by downstream neighbor, the column of the DRT corresponding to the unavailable downstream neighbor is updated at step 820. (In embodiments in which the DRTs are indexed by destination node or are double indexed by destination node and downstream neighbor, appropriate modifications to the network tables are made.) The downstream cluster is then computed at step 830 by calculating the union of the columns of the DRT and adding the node $N_i$ and its hop count 0 (represented symbolically as {Ni, 0} in FIG. 8) as discussed above. Next, a T4 trigger message including the downstream cluster is sent to upstream neighbors at step 840 (and to peers in embodiments in which peer routing is implemented) so that these neighbors can update their routing tables. The process is then complete.

Figure 9:
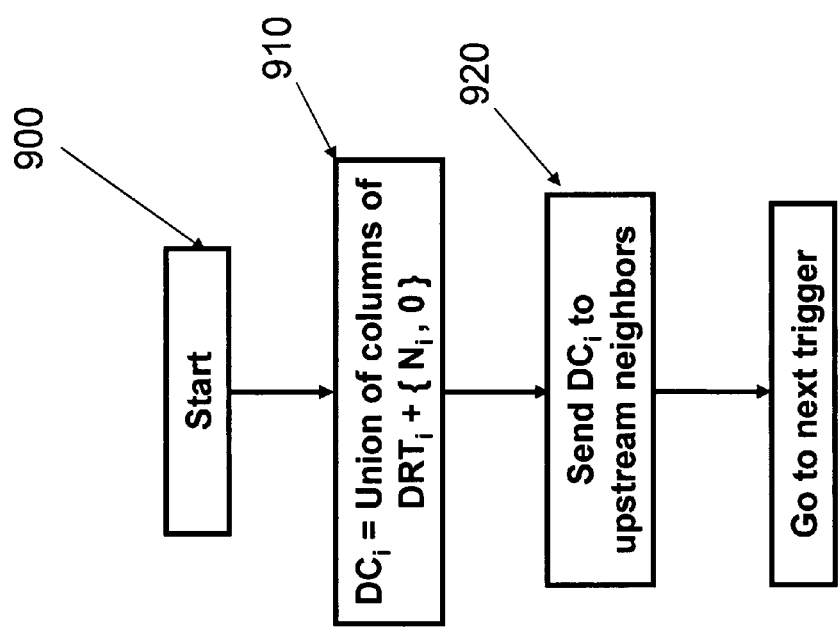
FIG. 9 is a flowchart illustrating the processing associated with a downstream trigger D2.

Trigger D2 occurs when a packet directed to a destination node is received at a node that does not have the destination node in its DRT. The processing of trigger D2 is shown in the flowchart 900 of FIG. 9. Upon receipt of a D2 trigger, the downstream cluster of the receiving node is calculated at step 910 and a new T4 trigger message including the downstream cluster is sent to upstream neighbors at step 920 to trigger the update of the routing tables of the upstream node that sent the packet. The process is then complete.

Figure 10:
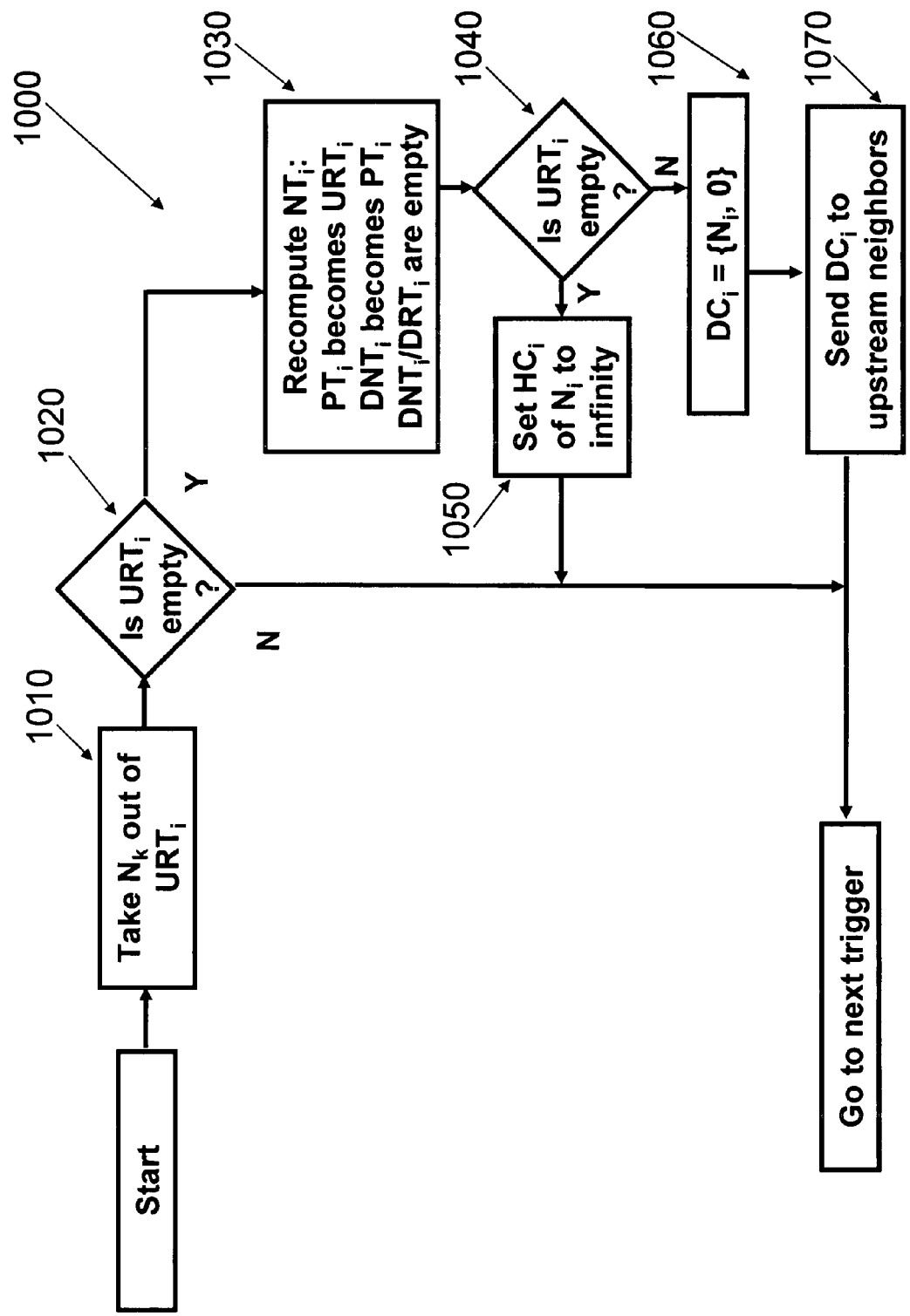
FIG. 10 is a flowchart illustrating the processing associated with an upstream trigger U1.

Trigger U1 occurs when a packet cannot be sent successfully to an upstream neighbor in a node's URT. The processing of trigger U1 is shown in the flowchart 1000 of FIG. 10.

The process begins by removing the upstream neighbor to which the packet could not be sent from the URT for that node at step 1010. If the URT is not empty at step 1020 (meaning there is another upstream neighbor through whom packets can be sent), the process ends. If the URT is empty at step 1020, node tables are re-computed at step 1030 as follows: the peer table becomes the upstream routing table, and the downstream neighborhood table becomes the peer table. The downstream neighborhood table and downstream routing tables are then empty. If the URT is still empty at step 1040, the hop count for that node is set to infinity at step 1050 and processing ends. If the URT is not empty at step 1040, the downstream cluster for the node is set to $\{N_i+0\}$ at step 1060 and a T4 trigger message including the downstream cluster is sent to the upstream neighbors in the URT at step 1070 and processing ends.

Figure 11:
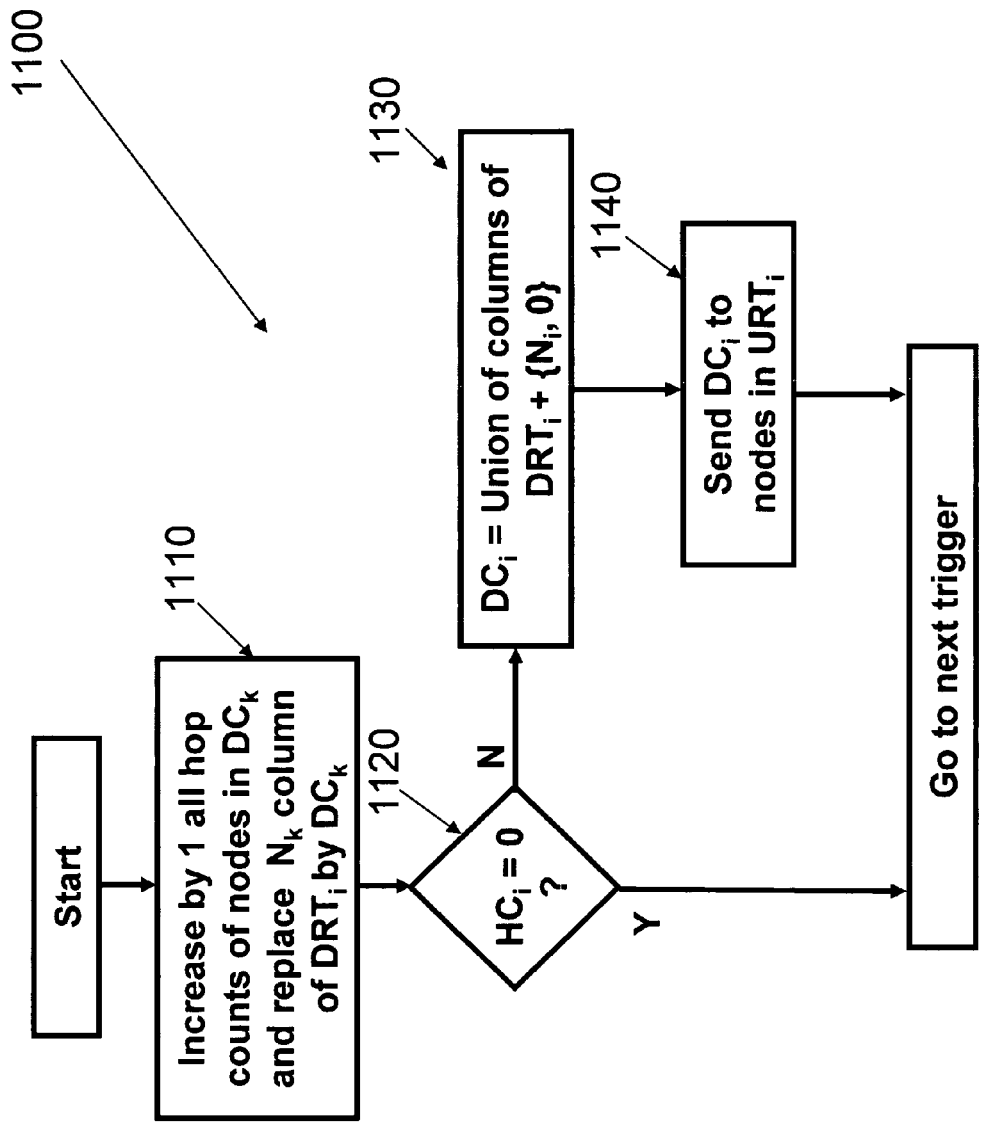
FIG. 11 is a flowchart illustrating the processing associated with a trigger T4.

The T4 trigger is generated during the processing of the routing triggers as discussed above. The purpose of the T4 trigger is to propagate downstream connectivity changes to upstream nodes in order to update their DRTs. The processing of a T4 trigger is illustrated by the flowchart 1100 of FIG. 11. The process begins at step 1110 with increasing by 1 the hop counts of the nodes in the received Trigger T4 and updating the downstream routing table which, in embodiments with DRTs indexed by downstream neighbor, involves replacing the corresponding column in the DRT with the new column received in the T4 trigger message. If the hop count for the node is zero at step 1120 (signifying that the highest level node has been reached), the process ends as there are no further upstream nodes. If the hop count is not zero at step 1120 (signifying that there is an upstream neighbor), the downstream cluster is calculated at step 1130 and sent to all upstream nodes in the URT in a new T4 trigger message at step 1140 and the process is complete.

In addition to triggers T1-T4, there is a trigger T5. The T5 trigger is generated by a periodic broadcast. That is, each node periodically broadcasts its node ID and hop count to inform neighboring nodes of its presence. When a broadcast message from another node is received that indicates a change of some kind, the T5 trigger is the mechanism that propagates the change through the network.

Figure 12:
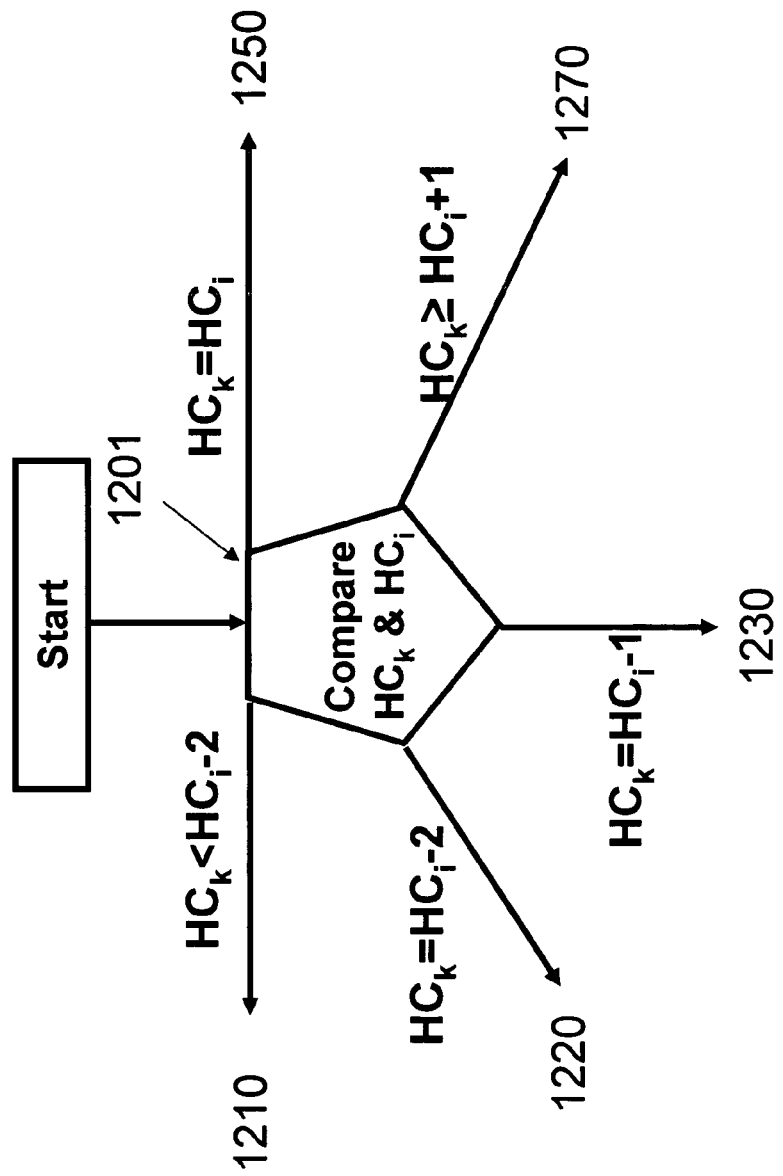
FIG. 12 is a logic diagram illustrating various processing of a trigger T5 depending upon the difference in hop counts between the sending and receiving nodes.

T5 trigger processing is illustrated by the flowchart 1200 of FIG. 12. Processing begins at step 1201, where the hop count of the node receiving the T5 trigger message ($HC_i$) is compared to the hop count ($HC_k$) of the node that sent the T5 trigger message. If the hop count of the receiving node is more than 2 hops downstream of the sending node, the processing at step 1210 is performed. If the hop count of the receiving node is exactly 2 hops downstream of the sending node, the processing of step 1220 is performed. If the hop count of the receiving node is exactly 1 hop downstream of the sending node, the processing of step 1230 is performed. If the hop counts are equal, the processing of step 1250 is performed. Finally, if the receiving node is upstream of the sending node (the hop count of the sending node is greater than or equal to the hop count of the receiving node plus one), the processing of step 1270 is performed.

Figure 13:
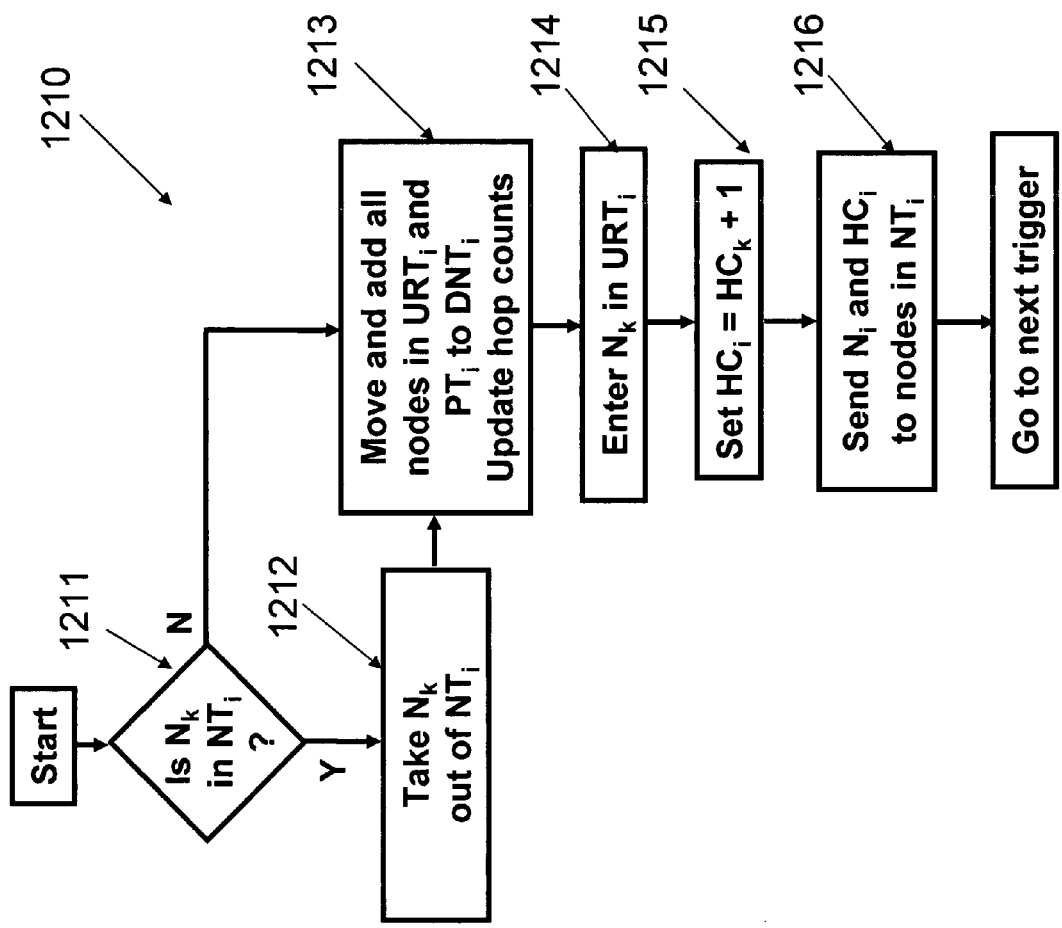
FIG. 13 is a flowchart illustrating in greater detail the processing associated with one of the steps of FIG. 12.

The processing of step 1210 is illustrated in the flowchart of FIG. 13. The process begins at step 1211, where the DNT, URT and PT of the receiving node are searched to determine whether the node ID ($N_k$) of the sending node is listed in any of those tables as being in the neighborhood of the receiving node. If so, the node is taken out of the corresponding table at step 1212. Then, or if the sending node was not in any of the neighborhood tables at step 1211, all nodes in the URT and PT for the receiving node are removed from those tables and added to the downstream neighborhood table DNT and the hop counts in the DNT are set to hop count of the sending node plus 2 at step 1213. The sending node is entered in the URT of the receiving node at step 1214, and the hop count for the receiving nose is set to the hop count of the sending node plus 1 at step 1215. Finally, the node ID and hop count of the receiving node are sent to other nodes in the receiving node's neighborhood in a new T5 trigger message at step 1216 and the process is complete. In other embodiments, the sending of the new T5 trigger message at step 1216 is delayed until the next periodic broadcast. It is also possible to not update the hop counts at step 1213 but rather update them upon receipt of a periodic broadcast message from the neighboring nodes, which will contain the updated hop count after the T5 trigger message is sent to the neighboring nodes at step 1216.

Figure 14:
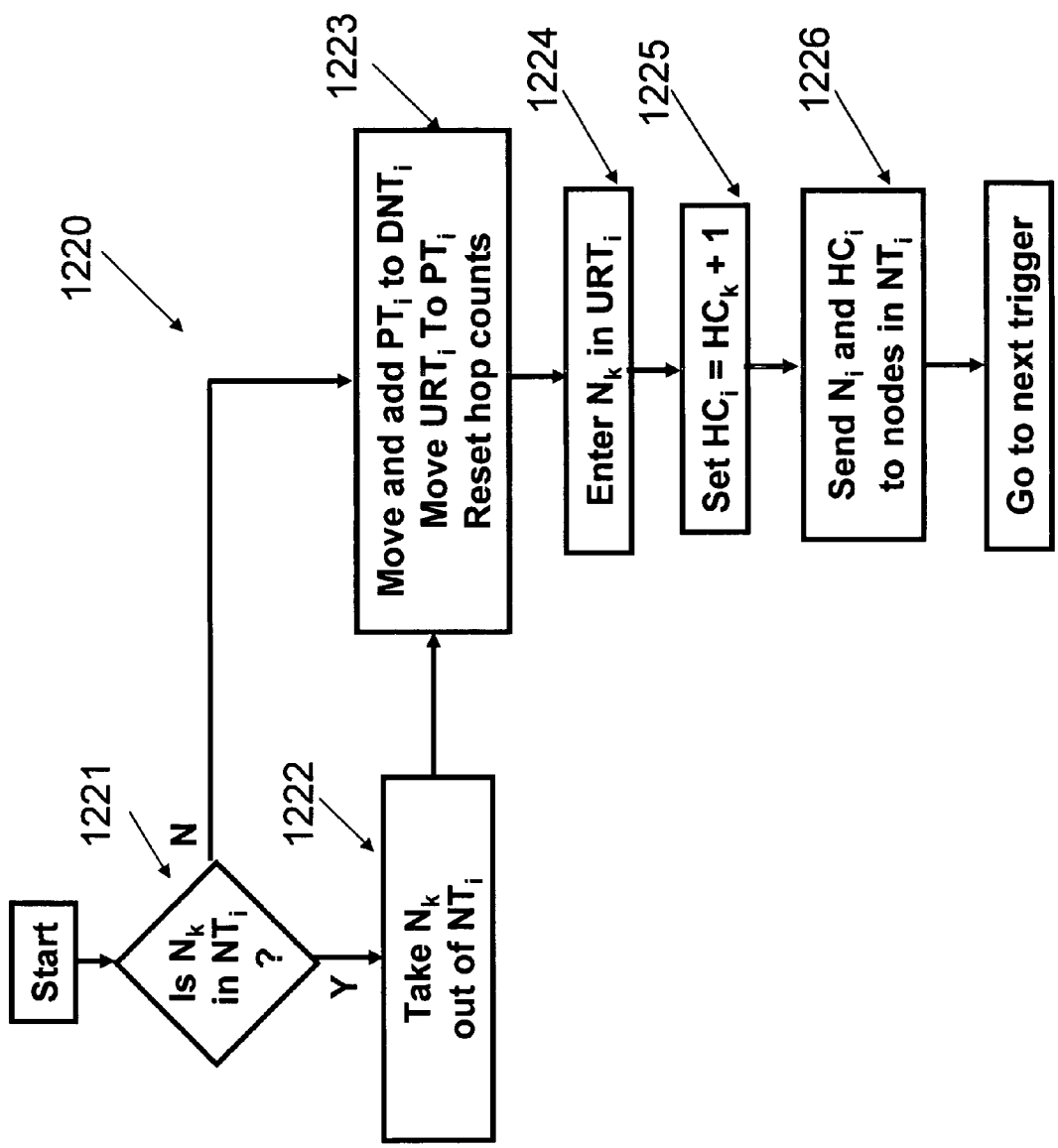
FIG. 14 is a flowchart illustrating in greater detail the processing associated with one of the steps of FIG. 12.

The processing of step 1220 is illustrated in the flowchart of FIG. 14. The process begins at step 1221, where the DNT, URT and PT of the receiving node is searched to determine whether the node ID ($N_k$) of the sending node is listed in any of those tables as being in the neighborhood of the receiving node. If so, the node is taken out of the corresponding table at step 1222. Next, the PT, DNT and URT are updated at step 1223. The nodes previously listed in the peer table PT are added to the downstream neighbor table DNT, the nodes previously listed in the URT are moved to the PT, and the hop counts are appropriately modified. The sending node is entered in the URT of the receiving node at step 1224, and the hop count for the receiving nose is set to the hop count of the sending node plus 1 at step 1225. Finally, the node ID and hop count of the receiving node are sent to other nodes in the receiving node's neighborhood in a new T5 trigger message at step 1226 and the process is complete. The alternative embodiments and methods discussed above in connection with FIG. 13 are applicable to the processing of FIG. 14 as well.

Figure 15:
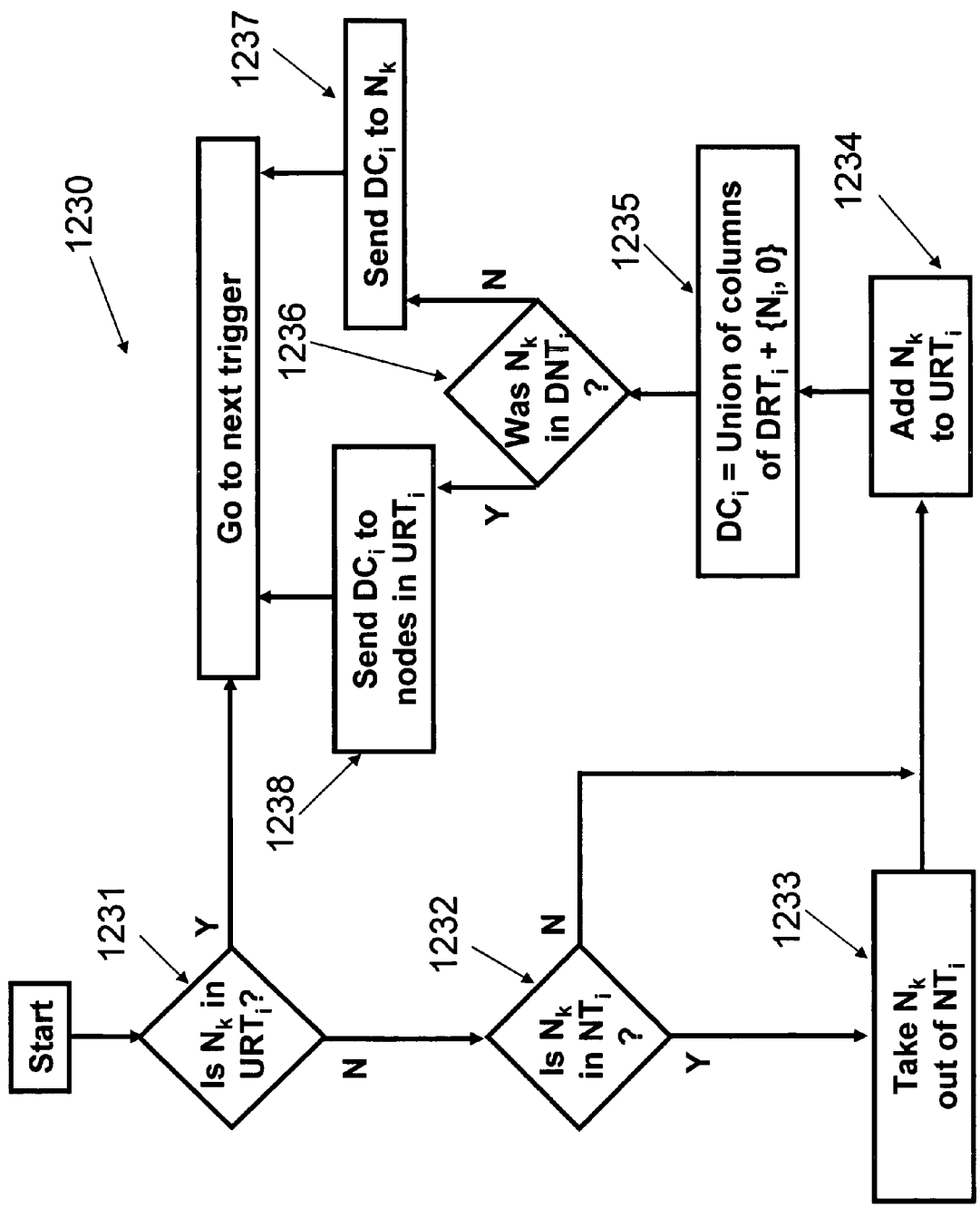
FIG. 15 is a flowchart illustrating in greater detail the processing associated with one of the steps of FIG. 12.

The processing of step 1230 (the hop count of the receiving node is one greater than the hop count of the sending node) is illustrated in the flowchart of FIG. 15. If the sending node is listed in the URT of the receiving node at step 1231, then processing is complete as there has been no change in the relative position of the sending and receiving nodes. If the sending node is not in the URT of the receiving node, then the DNT and PT of the receiving node are checked at step 1232 to determine if the sending node is listed in either of those tables. If so, the sending node is taken out of the corresponding table at step 1233. Next, or if the sending node was not in any of the neighborhood tables at step 1232, the sending node is added to the URT of the receiving node at step 1234 as the sending node has a lower hop count than the receiving node. The downstream cluster of the receiving node is computed at step 1235. Next, a check is made at step 1236 to determine if the sending node was previously listed in the downstream neighborhood table of the receiving node. If so, a T4 trigger message including the downstream cluster is sent to the sending node at step 1237 and processing is complete. If the sending node was not previously listed in the receiving node's downstream neighborhood table at step 1236, the T4 trigger message with the downstream cluster calculated at step 1235 is sent to the nodes in the receiving node's upstream routing table at step 1238 and processing is complete.

Figure 16:
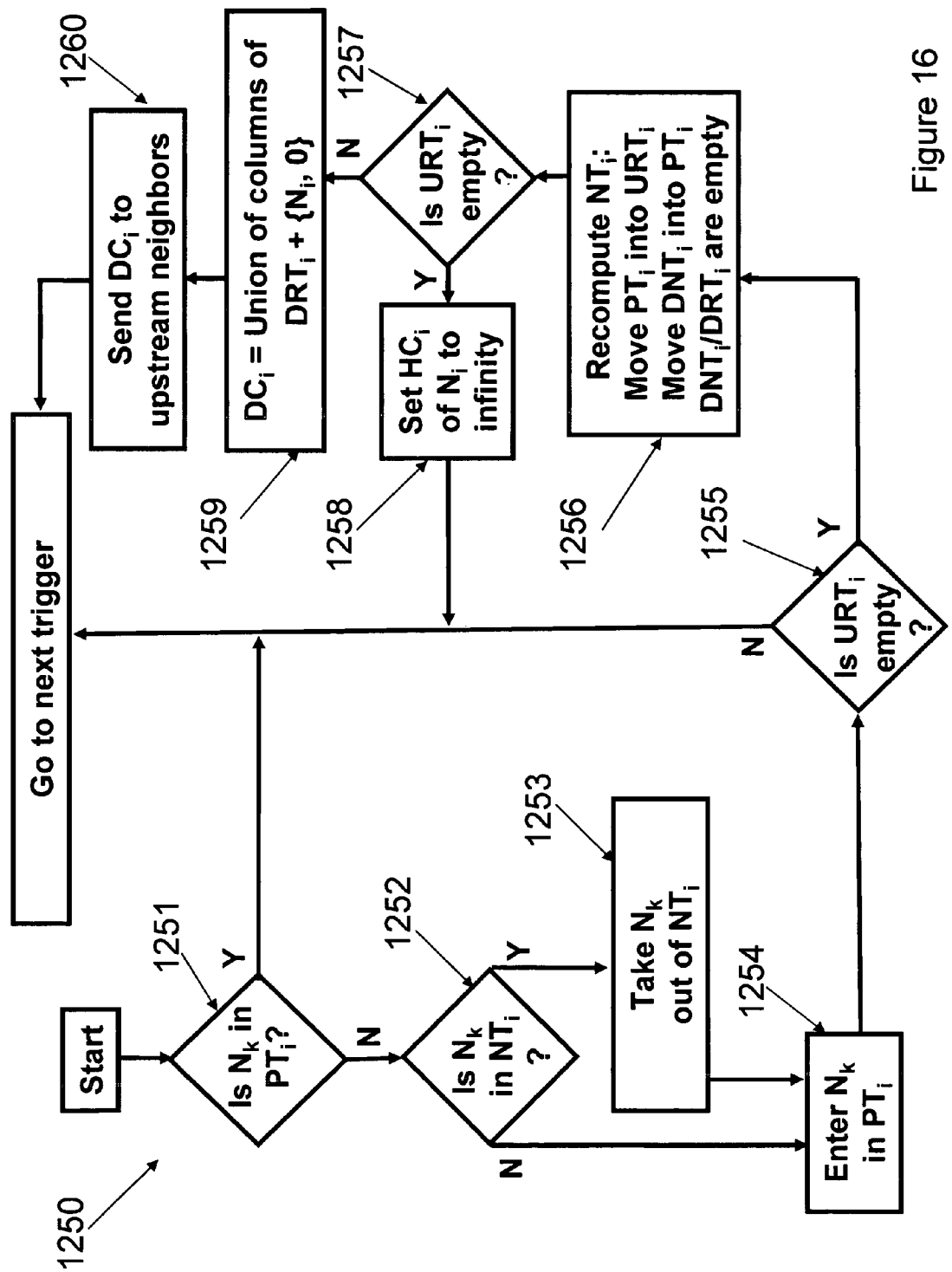
FIG. 16 is a flowchart illustrating in greater detail the processing associated with one of the steps of FIG. 12.

The processing of step 1250 is illustrated in the flowchart of FIG. 16. If the sending node (whose hop count is equal to the receiving node's hop count) is already listed in the peer table of the receiving node at step 1251, then processing is complete as there has been no change in the relative position of the sending and receiving nodes and nothing more need be done. If the sending node is not in the PT of the receiving node at step 1251, then the DNT and URT of the receiving node are checked at step 1252 to determine if the sending node is listed in either of those tables. If so, the sending node is taken out of the corresponding table at step 1253. Next, or if the sending node was not in the peer table at step 1252, the sending node is added to the PT of the receiving node at step 1254. Next, if the URT is not empty at step 1255, processing is complete.

If the URT is empty at step 1255 (meaning that there is no upstream node and hence no way to reach the fixed gateway node), then the three neighborhood tables are re-computed at step 1256. First, the nodes listed in the PT are moved to the URT (i.e., since no upstream node is available, packets destined for the fixed gateway node will be routed through a peer). Then, nodes listed in the downstream neighborhood table are moved to the peer table, and the downstream neighborhood table and downstream routing table are left empty. If the URT is still empty at step 1257 (i.e., there were no peers in the PT), then no path to the fixed gateway node is available and the hop count for the receiving node is set to infinity at step 1258 and processing is complete. If, however, the URT was not empty at step 1257, the downstream cluster is calculated at step 1259 and sent to the upstream neighbors at step 1260 and processing is complete.

The T5 trigger discussed above will generally propagate downstream because it is initiated by a new RF association with a fixed gateway node. This downstream propagation will work even when nodes are isolated (i.e., have an infinite hop count) because the comparison between an infinite hop count with a finite hop count will select the processing of step 1210.

Figure 17:
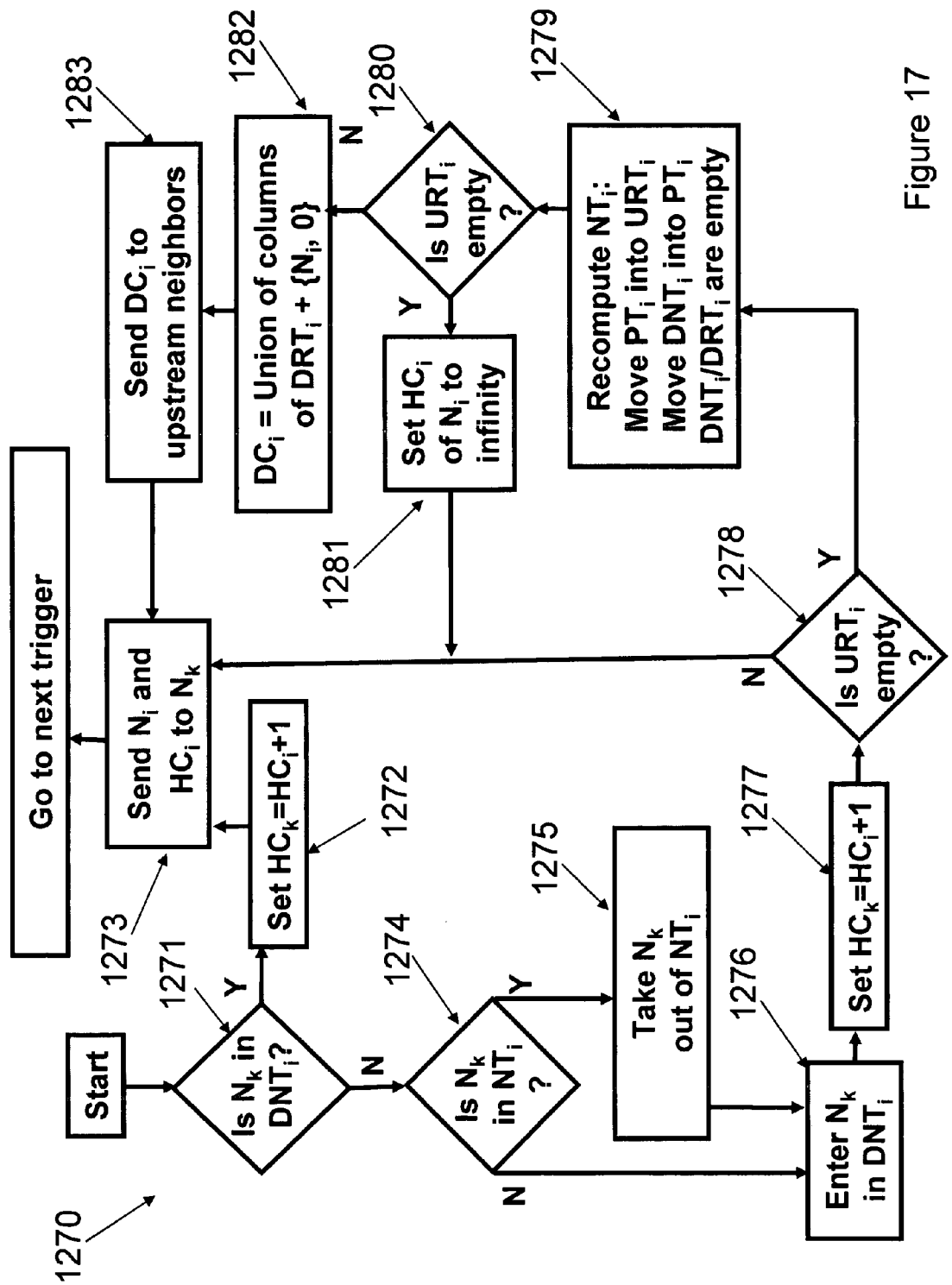
FIG. 17 is a flowchart illustrating in greater detail the processing associated with one of the steps of FIG. 12.

The processing of step 1270 (the hop count of the sending node is at least one greater than the hop count of the receiving node) is illustrated in the flowchart of FIG. 17. If the sending node is already listed in the downstream neighbor table of the receiving node at step 1271, then the hop count of the sending node is set equal to the hop count of the receiving node plus one at step 1272 and a new T5 trigger message including the hop count of the receiving node is sent to the sending node at step 1273 and processing is complete. If the sending node is not in the DNT of the receiving node at step 1271, then the PT and URT of the receiving node are checked at step 1274 to determine if the sending node is listed in either of those tables. If so, the sending node is taken out of the corresponding table at step 1275. Next, or if the sending node was not in the peer table or URT at step 1274, the sending node is added to the downstream neighbor table of the receiving node at step 1276. The hop count of the sending node is set equal to the hop count of the receiving node plus one at step 1277. Next, if the URT is not empty at step 1278, the node identification and hop count of the receiving node are sent to the sending node at step 1273 and processing is complete. It should be noted that, in alternative embodiments, it is also possible to wait for the next periodic broadcast from neighboring nodes to update the hop counts rather than updating the hop counts at step 1256.

If the URT is empty at step 1278 (meaning that there is no upstream node and hence no way to reach the fixed gateway node), then the three neighborhood tables are re-computed at step 1279. First, the nodes listed in the PT are moved to the URT (i.e., since no upstream node is available, packets destined for the fixed gateway node will be routed through a peer). Then, nodes listed in the downstream neighborhood table are moved to the peer table, and the downstream neighborhood table and downstream network table are left empty. If the URT is still empty at step 1280 (i.e., there were no peers in the PT), then no path to the receiving node is available and the hop count for the receiving node is set to infinity at step 1281 and step 1273 is performed. If, however, the URT was not empty at step 1280, the downstream cluster is calculated at step 1282 and sent to the upstream neighbors in a T4 trigger message at step 1283. Then, the node identification and hop count of the receiving node are sent to the sending node at step 1273 and processing is complete. It should be noted that the alternatives discussed above in connection with FIG. 13 (i.e., not updating the hop counts at step 1279 and waiting until the next periodic broadcast to send the hop counts and node IDs rather than sending them at step 1273) are also applicable to this processing.

In addition to the triggers described above, a mechanism to remove obsolete links from the upstream routing table, peer table and downstream network table is necessary. This mechanism can take the form of periodic audits in which all of the nodes in the aforementioned tables are checked periodically. Alternatively, an activity watchdog for each neighbor node can be set up to trigger action if the neighbor node has been idle for too long.

The first mechanism involves periodically auditing the entries for the URT, PT and DNT. In the URT audit, the time since each node in the URT has been heard from is checked. If a node has been silent for more than a threshold period of time, the node is removed from the URT and the processing associated with a T3 trigger (steps 1010-1070 of FIG. 10) is performed. If a peer node in the PT has been inactive for more than a threshold period of time, it is simply removed from the peer table. Finally, in the DRT audit, the time since each node in the DRT has been heard from is checked. If a downstream node in the DRT has been inactive for more than a threshold period of time, the processing associated with a T1 trigger (steps 810-840 of FIG. 8) is performed.

The processing of the second mechanism, activity watchdogs, works in the same fashion described above in connection with the periodic audits whenever an activity watchdog indicates that a node has been idle for more than a threshold period of time.

Any given mobile node will be associated with a growing number of fixed gateway nodes over time as that mobile node moves around. As a practical matter, preferred embodiments maintain only a limited number of associations (e.g., 3) with fixed gateway nodes. In such embodiments, the maintained associations are referred to as principal associations. One way that this can be accomplished is by having a new association replace an old association and trigger its elimination in the neighborhood tables. If a principal association with a fixed gateway node becomes "broken" (i.e., communications with the fixed gateway node become impossible), the association becomes inactive but is still maintained (i.e., it is not dropped as in the case where a new association replaces an old one) as a peer node. It is important to continue maintaining inactive associations because they may become active again (e.g., a mobile unit makes a U-turn or goes around a curve in the road).

In the embodiments described above, a correction in a DRT is immediately propagated upward. Since URT corrections propagate downward, this will create successive waves of DRT update propagation upward as the URT corrections propagate downward. In this manner, infrastructure updates are propagated immediately, which results in fewer mishandled packets. However, this requires more CPU resources. Alternatively, the algorithms discussed herein can be modified so that any upstream propagation of DRT updates only occurs when a node that has modified its DRT has no downstream neighbors. This would delay infrastructure updates, but would be computationally more economical.

Obviously, numerous other modifications and variations of the present invention are possible in light of the above teachings. It is therefore to be understood that within the scope of the appended claims, the invention may be practiced otherwise than as specifically described herein.

What is claimed is:

1. An Internet-oriented mobile ad-hoc network comprising:
at least one fixed gateway node, the at least one fixed gateway node being in communication with the Internet; and
a plurality of wireless nodes communicatively accessible downstream from the at least one fixed gateway node through any number of intermediate nodes and being able to communicate upstream with the at least one fixed gateway node through any number of intermediate nodes, each of the wireless nodes including wireless transceivers, each of the wireless nodes further including, for each of the at least one fixed gateway node, an upstream routing table (URT), a peer table (PT), a downstream neighborhood table (DNT) and a downstream routing table (DRT), each of the wireless nodes being configured to use the associated tables to make routing decisions, some of the wireless nodes being mobile wireless nodes, some of the mobile wireless nodes being configured to act as a relay for other wireless nodes that cannot directly access the at least one fixed gateway node;
wherein the URT of a wireless node Ni is updated independently by the wireless node Ni and lists each upstream neighboring node that is closer by one hop, to a particular fixed gateway node than is the node Ni, together with the hop count from the upstream neighboring node to the particular fixed gateway;
wherein the PT of the wireless node Ni is updated independently by the wireless node Ni and lists each peer node, defined as a neighboring node that has equal distance, as measured by hop count, to a particular fixed gateway node as the wireless node Ni, together with an associated hop count to the particular fixed gateway;
wherein the DNT of the wireless node Ni is undated independently by the wireless node Ni and lists each neighboring downstream node that is one hope count further away from a particular fixed gateway node than the node Ni, together with the hop count of the downstream neighboring node to the particular fixed gateway node;
wherein the DRT of the wireless node Ni is undated independently by the wireless node Ni and lists each downstream node Nk, as defined by a node that can communicate with the node Ni and is further away from the node Ni, as measured by hop counts of the nodes Ni and Nk to a particular fixed gateway node, together with the hop count of the downstream node Nk to the node Ni;
wherein each node periodically broadcasts a trigger message that comprises a node identification and hop count corresponding to a particular node to inform neighboring nodes that the particular node is present;
wherein each node independently and periodically receives and processes control signals from neighboring nodes; and
wherein each node updates the tables within itself and each node communicates changes to neighboring nodes.

2. The network of claim 1, wherein the at least one fixed gateway node is directly connected to the Internet.

3. The network of claim 1, wherein the at least one fixed gateway node includes a plurality of fixed gateway nodes, for every fixed gateway Gj, the wireless node Ni can communicate with, wireless node Ni has a different set of tables, URTij, PTij, DNTij and DRTij;

wherein the URTij of the wireless node Ni with respect to the fixed gateway Gj lists each upstream neighboring node that is closer by one hop to the fixed gateway Gj than the node Ni, together with the hop count of the upstream node to the fixed gateway Gj;

the PTij of the wireless node Ni with respect to the fixed gateway Gj lists each peer node, as defined as a neighboring node that has equal distance, as measured by a hop count, to the fixed gateway Gj as Ni, together with an associated hop count to the fixed gateway Gj;

the DNTij of the wireless node Ni with respect to the fixed gateway Gj lists each downstream neighboring node that is further away from the fixed gateway Gj than Ni, together with the hop count of the downstream node to the fixed gateway Gj; and the DRTij of the wireless node Ni with respect to the fixed gateway Gj lists each downstream node, as defined by a node that is reachable from Ni and is further away, as measured by a hop count, from the fixed gateway Gj than Ni, together with the hop count of the downstream node to the fixed gateway Gj;

wherein the wireless node Ni independently receives and processes control signals from neighboring nodes; and wherein the wireless node Ni updates the tables within itself and each node communicates changes to neighboring nodes.

4. The network of claim 1, wherein the at least one fixed gateway node is connected to the Internet via a central node.

5. The network of claim 4, wherein the central node is connected to at least one other fixed gateway node.

6. The network of claim 1, wherein each of the wireless nodes is configured to act as a relay for other wireless nodes that cannot directly access the at least one fixed gateway node.

7. The network of claim 1, wherein all of the wireless nodes are mobile nodes.

8. The network of claim 1, wherein some of the wireless nodes are mobile nodes and other wireless nodes are fixed nodes.

9. The network of claim 1, wherein the DRTs are indexed by destination node.

10. The network of claim 1, wherein the DRTs are indexed by downstream neighbor.

11. The network of claim 1, wherein the DRTs are indexed by both destination node and downstream neighbor.

12. A method for Internet-oriented mobile ad-hoc network upon a failure, the Internet-oriented mobile ad-hoc network including a multiplicity of mobile wireless nodes and at least one fixed node acting as a gateway to other networks outside the Internet-oriented mobile ad-hoc network, the method comprising the steps of:
receiving a packet by a mobile wireless node Ni, wherein the network has a plurality of wireless nodes, Ni, wherein each mobile wireless node Ni in the network, for each of the at least one fixed gateway node Gk, includes an upstream routing table (URT), a peer table (PT), a downstream neighboring table (DNT) and a downstream routing table (DRT), wherein the URT is updated independently by the wireless node Ni and lists each upstream neighboring node that is closer by one hop to a particular fixed gateway node than the node Ni, together with the hop count of the upstream node to the particular fixed gateway, wherein the PT is updated independently by the wireless node Ni and lists each peer node, as defined as a neighboring node that has equal distance, as measured by hop count, to a particular fixed gateway node as the node Ni, together with an associated hop count to the particular fixed gateway, wherein the DNT is updated independently by the wireless node Ni and lists each neighboring downstream node that is further away from a particular fixed gateway node than the node Ni, together with the hop count of the downstream node to the particular fixed gateway; and wherein the DRT is updated independently by the wireless node Ni and lists each downstream node, as defined by a node that is reachable from the node Ni and is further away, as measured by a hop count, from a particular fixed gateway node than the node Ni, together with the hop count of the downstream node;

receiving a trigger message by the receiving mobile wireless node, wherein the trigger message is generated by a neighboring node; and updating the tables of the receiving mobile wireless node by the receiving mobile wireless node and thus reorganizing the network.

13. The method of claim 12, further comprising:
generating a trigger message D1 when the packet cannot be sent successfully from the wireless node Ni to a downstream neighbor Nk in the DNT of the wireless node Ni;
processing the generated trigger message D1 by removing the downstream neighbor Nk to which the packet could not be sent from the DNT of the wireless node Ni;
updating the DRT of the wireless node Ni;
computing a downstream cluster by calculating a union of columns of the DRT and adding the wireless node Ni and its hop count 0; and
sending a trigger message T4 including the downstream cluster to upstream neighbors of the wireless node Ni.

14. The method of claim 13, further comprising:
generating a trigger message D2 upon the occurrence of the event when the packet cannot be sent successfully from the wireless node Ni to a destination node Nd in the DRT of wireless node Ni;
processing the generated trigger message D2 by computing a downstream cluster, the computing comprising calculating a union of columns of the DRT and adding the wireless node Ni and its hop count 0; and
sending a trigger message T4 including the downstream cluster to upstream neighbors of the wireless node Ni.

15. The method of claim 12, further comprising:
generating a trigger message U1 when the packet cannot be sent successfully from the wireless node Ni to an upstream neighbor Nk in the URT of the wireless node Ni;
processing the generated trigger message U1 by removing the upstream neighbor Nk to which the packet could not be sent from the URT of the wireless node Ni;
if the URT is not empty, ending the process; and
if the URT is empty:
  making the PT of wireless node Ni the new URT of the receiving wireless node Ni;
  making the DNT of wireless node Ni the new PT of the receiving wireless node Ni;
  emptying the DNT and DRT of wireless node Ni;
  if the new URT of wireless node Ni is empty, setting a hop count of wireless node Ni to infinity and ending the process; and
  if the new URT of wireless node Ni is not empty:
    computing a downstream cluster by calculating a union of columns of the DRT and adding wireless node Ni and its hop count 0; and
    sending a trigger message T4 including the downstream cluster to upstream neighbors of wireless node Ni.

16. The method of claim 13, further comprising:
in response to wireless node Ni receiving the trigger message T4, modifying the trigger message T4 by increasing all hop counts of nodes in the trigger message T4 by one;
replacing the Nk column of the DRT of wireless node Ni by the modified T4; and
if the hop count of the node Ni is zero, ending the process; and
if the hop count of the node Ni is not zero:
  computing a downstream cluster by calculating a union of columns of the DRT and adding wireless node Ni and its hop count 0; and
  sending a trigger message T4 including the downstream cluster to upstream neighbors of wireless node Ni.

17. The method of claim 12, further comprising:
periodically broadcasting a trigger message T5 by each node, each trigger message T5 comprising a node ID and hop count corresponding to a particular node to inform neighboring nodes that the particular node is present;
generating a trigger message T5 upon predetermined changes;
receiving at receiving wireless node Ni the trigger message T5 sent by a sending node Nk;
comparing the hop count of the receiving wireless node Ni with the hop count of the sending node Nk;
if a difference between the hop count of the receiving wireless node Ni and the hop count of the sending node Nk is greater than 2:
  removing Nk from the neighborhood of Ni if Nk is in the neighborhood;
  moving and adding all the nodes of the URT and PT of node Ni into the DNT of node Ni;
  moving Nk into the URT of Ni;
  resetting the hop count of Ni to the hop count of Nk augmented by 1; and
  sending to all the neighbors of Ni a trigger message T5 composed of Ni and its hop count;
if a difference between the hop count of the receiving wireless node Ni and the hop count of the sending node Nk is equal to 2:
  removing Nk from the neighborhood of Ni if Nk is in the neighborhood;
  moving and adding all the nodes of the PT of node Ni into the DNT of node Ni, then moving all the nodes of the URT of Ni to the PT of Ni;
  moving Nk into the URT of Ni;
  resetting the hop count of Ni to the hop count of Nk augmented by 1; and
  sending to all the neighbors of Ni a trigger message T5 composed of Ni and its hop count
if a difference between the hop count of the receiving wireless node Ni and the hop count of the sending node Nk is equal to 1:
  if Nk is in the URT of Ni, ending the process; and
  if Nk is not in the URT of Ni:
    if Nk is in the neighborhood of Ni, removing Nk from the neighborhood of Ni;
    adding Nk to the URT of Ni;
    computing a trigger message T4 by performing a union of columns of the DRT of Ni and adding the node Ni with a hop count of zero; and
    sending the trigger message T4 to all the nodes in the URT of Ni if Nk was in the DNT of Ni, otherwise sending the trigger message T4 to Nk only;
if a difference between the hop count of the sending wireless node Nk and the hop count of the receiving node Ni is greater than or equal to 1:

if node Nk is in the DNT of node Ni, setting the hop count of node Nk to the hop count of Ni plus 1; and
if node Nk is not in the DNT of node N:
    if Nk is in the Neighborhood of Ni, removing Nk from the neighborhood table of node Ni;
    entering Nk into the DNT of Ni
    setting the hop count of node Nk to the hop count of Ni plus 1;
    if the URT of node Ni is empty, then moving the nodes in PT of Ni into URT; and
        moving the nodes in DNT of Ni into PT;
    if the URT of node Ni is not empty:
        computing a trigger message T4 by performing the union of the columns of the DRT of Ni and adding node Ni with hop count zero; and
        sending the trigger message T4 to all the nodes in the URT of node Ni;
    setting the hop count of Ni to infinity if URT of Ni is empty;
sending a trigger message T5 (Ni and its hop count) to Nk;
if the hop count of the sending wireless node Nk and the hop count of the receiving node Ni are equal:
    if Nk is in the PT of Ni, ending the process; and
    if Nk is not in the PT of Ni:
    if Nk is in the Neighborhood of Ni, removing Nk out of the neighborhood of Ni;
    entering node Nk into the PT of Ni:
    setting the hop count of Nk to the hop count of Ni;
    if the URT of node Ni is empty, then
        moving the nodes in PT of Ni into URT, and
        moving the nodes in DNT of node Ni into PT;
        if URT of node Ni is empty, setting the hop count of Ni to infinity;
    and
    if the URT of Ni is not empty, then:
        Computing a trigger message T4 by performing the unions of the columns of the DRT of Ni and adding Ni with hop count zero;
        Sending the trigger message T4 to all the nodes in the URT of Ni;
    moving to process next signal.

18. The method of claim 12, wherein receiving a packet by a mobile wireless node Ni comprises receiving a packet by a mobile wireless node Ni that has multiple simultaneous associations with fixed gateway nodes, thereby providing additional communication paths from every node Ni to fixed gateways, eliminating the need for active handover dialogue between node Ni and fixed gateways and Preventing dropped communication lines.

19. The method of claim 12, for comprising:
extracting from the packet a final destination address;
wherein if the final destination address is Ni, then halting further processing of the packet, and otherwise:
    if the final destination address of the packet is not inside the Internet-oriented mobile ad-hoc network and Ni is a fixed gateway, then sending the packet to the final destination;
    if the final destination address of the packet is not inside the Internet-oriented mobile ad-hoc network and Ni is not a fixed gateway, then sending the packet to a destination in a URTik of Ni towards fixed Gateway Gk, and:
        if there is a failure, then generate a trigger message U1k;
    if the final destination address of the packet is inside the Internet-oriented mobile ad-hoc network and it is not in any DNTij or a DRTij of Ni, then:
        if Ni is the fixed gateway, then halting further processing, and
        if Ni is not the fixed gateway, sending the packet to a destination in a URTik of Ni towards fixed Gateway Gk; and
        if there is a failure, then generate a trigger message U1k;
    if the final destination address of the packet is inside the Internet-oriented mobile ad-hoc network and the final destination address is in a DNTij or in a DRTij of node Ni, then sending the packet to that destination and
    if there is a failure, then generating a trigger message D1j, if the destination is in DNTij, or a trigger message D2j, if the destination is in DRTij.

20. The method of claim 18, wherein for each particular fixed Gateway in the potential multiplicity of fixed Gateways, at every node Ni that can communicate with that particular fixed Gateway, the multiplicity of trigger messages generated with respect to any particular fixed Gateway Gj is processed independently of the multiplicity of trigger messages generated with respect to any other fixed Gateway Gk.

* * * * *